(12) United States Patent
Yoshikawa et al.

(10) Patent No.: US 9,165,343 B2
(45) Date of Patent: Oct. 20, 2015

(54) IMAGE PROCESSING APPARATUS AND IMAGE PROCESSING METHOD

(71) Applicant: FUJITSU LIMITED, Kawasaki-shi, Kanagawa (JP)

(72) Inventors: Hiroyasu Yoshikawa, Kawasaki (JP); Yukio Hirai, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 14/035,325

(22) Filed: Sep. 24, 2013

(65) Prior Publication Data

US 2014/0169694 A1 Jun. 19, 2014

(30) Foreign Application Priority Data

Dec. 17, 2012 (JP) ................. 2012-275108

(51) Int. Cl.
*G06K 9/40* (2006.01)
*G06T 5/00* (2006.01)
*G06T 5/20* (2006.01)

(52) U.S. Cl.
CPC ............. *G06T 5/001* (2013.01); *G06T 5/002* (2013.01); *G06T 5/003* (2013.01); *G06T 5/20* (2013.01); *G06T 2207/20021* (2013.01)

(58) Field of Classification Search
None
See application file for complete search history.

(56) References Cited

U.S. PATENT DOCUMENTS

| 6,236,766 B1 * | 5/2001 | Zavaljevski et al. .......... 382/300 |
| 2002/0031257 A1 | 3/2002 | Kato |
| 2002/0146180 A1 | 10/2002 | Hirakoso |
| 2007/0292047 A1 * | 12/2007 | Jiao et al. ..................... 382/279 |
| 2009/0129696 A1 | 5/2009 | Komatsu et al. |
| 2009/0136148 A1 | 5/2009 | Lim et al. |
| 2009/0262183 A1 | 10/2009 | Hayashi et al. |

FOREIGN PATENT DOCUMENTS

| JP | 2000-278503 | 10/2000 |
| JP | 2002-101296 | 4/2002 |
| JP | 4236123 | 3/2009 |
| JP | 2009-089082 | 4/2009 |
| JP | 2009-124598 | 6/2009 |
| JP | 2012-023498 | 2/2012 |
| WO | 2009/153717 A2 | 12/2009 |

OTHER PUBLICATIONS

Jaeguyn Lim et al; "Robust Local Restoration of Space-Variant Blur Image"; Proceedings of SPIE; vol. 6817, Feb. 14, 2008, p. 68170S, XP055070794, ISSN: 0277-786X, DOI: 10.1117/12.766456.

(Continued)

*Primary Examiner* — Utpal Shah
*Assistant Examiner* — Narek Zohrabyan
(74) *Attorney, Agent, or Firm* — Fujitsu Patent Center

(57) ABSTRACT

An image processing apparatus includes a calculation section configured to calculate filtering coefficients of a filter with a first area in an image that is partitioned into multiple first areas including the first area, the image being partitioned differently into multiple second areas, each one of which being covered by several first areas, to calculate a convoluted image of a second area using the filtering coefficients calculated with the first areas covering a part of the second area, the calculation being executed for the several first areas covering distinct parts of the second area, respectively; and an interpolation section configured to interpolate a pixel in the second area using pixels at the same position in the convoluted images of the second area which are convoluted with the respective filtering coefficients.

6 Claims, 22 Drawing Sheets

(56) References Cited

OTHER PUBLICATIONS

Christian Loebich et al; "Digital Camera Resolution Measurement Using Sinusoidal Siemens Stars"; Proceedings of SPIE; vol. 6502; Feb. 15, 2007; p. 65020N, XP055190299, ISSN: 0277-786X, DOI: 10.1117/12.703817.

EESR—Extended European Search Report mailed on Jun. 5, 2015 issued with respect to the corresponding European Patent Application No. 13186592.5.

* cited by examiner

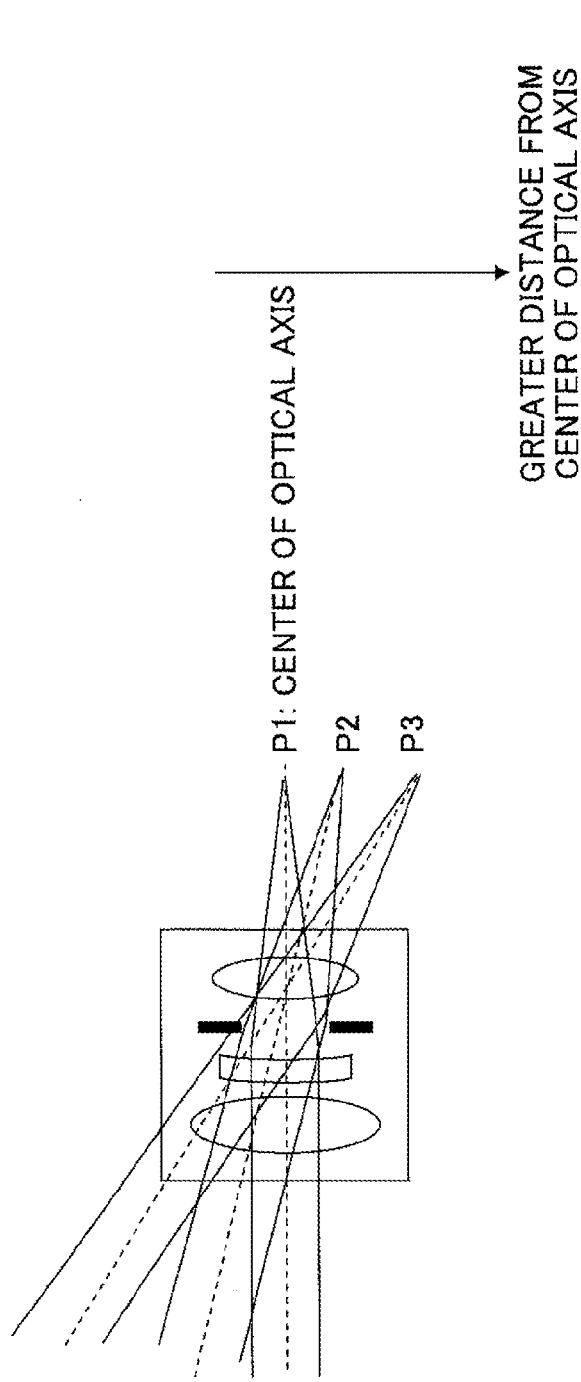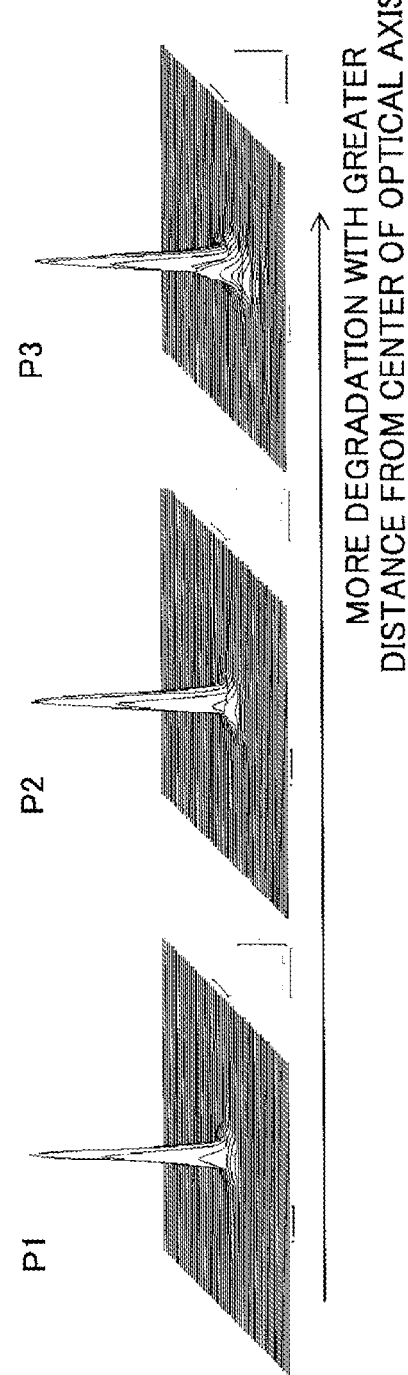
FIG.1
FIG.2

FIG.11

| | COMPARISON EXAMPLE | | FIRST EMBODIMENT | |
|---|---|---|---|---|
| ①INTERPOLATION (NUMBER OF PRODUCT-SUM OPERATIONS: 15) | NUMBER OF OPERATIONS: 25 | | NUMBER OF OPERATIONS: 1 | |
| ②CONVOLUTION (NUMBER OF PRODUCT-SUM OPERATIONS: 49) | NUMBER OF OPERATIONS: 1 | | NUMBER OF OPERATIONS: 4 | |
| TOTAL NUMBER OF PRODUCT-SUM OPERATIONS | 15×25+49×1=424 | | 15×1+49×4=211 | |

| POSITION | FILTER COEFFICIENT GROUP |
|---|---|
| $(x_1, y_1)$ | FIL1 |
| $(x_2, y_2)$ | FIL2 |
| ⋮ | ⋮ |
| $(x_n, y_n)$ | FILn |

IMAGE PROCESSING APPARATUS AND IMAGE PROCESSING METHOD

CROSS-REFERENCE TO RELATED APPLICATIONS

This application is based upon and claims the benefit of priority of the prior Japanese Priority Application No. 2012-275108 filed on Dec. 17, 2012, the entire contents of which are hereby incorporated by reference.

FIELD

The disclosures herein generally relate to an image processing apparatus and an image processing method.

BACKGROUND

Conventionally, various image processing methods have been proposed for removing defocus in an image captured by an optical system (see, for example, Patent Documents 1-3).

With such a conventional technology, filtering is executed for recovering an image based on a PSF (Point Spread Function) of an optical system. However, the PSF of an optical system often changes depending on an angle (direction) of entering light. Therefore, resolution of an imaging device such as a digital camera is usually degraded at a peripheral part of an image compared to the optical axis center part due to the optical system aberration and field angle dependency of an opening size. Picture quality degradation due to field angle dependency is especially notable with an optical system using an inexpensive lens.

To cope with such a change of PSF caused by an entering light angle, there is a technology for compensating an image that applies filtering to the image using filter data that is variable with a position of an object to be processed in the image (see, for example, Patent Document 4).

Picture quality degradation of a peripheral part in an image can be calculated with the transfer function of an optical system, which describes a degree of degradation changing with the distance from the optical axis center (least degraded part), which is set as the center of a captured image.

FIG. 1 is a schematic view illustrating an example of an optical system. FIG. 2 is a schematic view illustrating an example of degradation of the PSF. As illustrated in FIGS. 1-2, PSF degradation becomes greater as the distance from the optical axis center increases. Here, a degree of degradation at a peripheral part can be calculated based on lens data including a lens surface form, thickness, material, and the like in an the optical system described in a predetermined format (see, for example, Patent Document 4).

When using an image compensation technology that applies filtering to an image using filter data that is variable with a position of an object to be processed in the image, it is preferable to use filtering coefficients that are appropriate for a specific position.

Image compensation to recover from image degradation at a peripheral part of an image is practically implemented with applying filtering with a size of, for example, 5×5. Also, recovering from peripheral degradation requires filtering coefficients to be changed depending on a position.

In this case, an image is partitioned into areas to which applicable filtering coefficients (compensation coefficients) are calculated. Moreover, using filtering coefficients of a sample point (arbitrary pixel) in each area, filtering coefficients of pixels other than the sample point can be calculated with interpolation.

Incidentally, there is a technology for image compensation using interpolation, which is applied to luminance values, instead of filtering coefficients (see, for example, Patent Document 5-6).

For example, compensation values for pixels at sample points are provided beforehand, a compensation amount of a pixel in an area enclosed by the sample points is calculated from the sample points with, for example, bilinear interpolation for all pixels in the area.

FIG. 3 is a schematic view illustrating interpolation of pixel values. Solid-line frames illustrated in FIG. 3 define areas, a white circle represents a pixel value at a sample point in each area, and dashed-line frames define areas where interpolation is applied. FIG. 4 is another schematic view further illustrating interpolation of pixel values. As illustrated in FIG. 4, using pixel values at the sample points for bilinear interpolation, pixel values at interpolation points are obtained.

RELATED-ART DOCUMENTS

Patent Documents

[Patent Document 1] Japanese Laid-open Patent Publication No. 2009-124598
[Patent Document 2] Japanese Laid-open Patent Publication No. 2009-89082
[Patent Document 3] Japanese Patent No. 4236123
[Patent Document 4] Japanese Laid-open Patent Publication No. 2012-23498
[Patent Document 5] Japanese Laid-open Patent Publication No. 2000-278503
[Patent Document 6] Japanese Laid-open Patent Publication No. 2002-101296

Here, if luminance values are interpolated, luminance values themselves are to be interpolated, which means there is only one variable to be interpolated.

However, if filtering coefficients for filtering are to be interpolated, filtering coefficients at a sample point forms a matrix (for example, 5×5 variables), which will be described later with reference to FIG. 5. Also, filtering coefficients for an area are different from coefficients for other areas in an image, which necessitates interpolation operations on 5×5 variables for all pixels.

Interpolation with variable filtering coefficients requires more operations than interpolation with fixed filtering coefficients applied to all pixels.

FIG. 5 is a schematic view illustrating a problem of a conventional technology. As illustrated in FIG. 5, to obtain interpolated filtering coefficients at a point (for example, a1), interpolation operations on 5×5 variables (FIL_1-FIL_25) are required. For an image as a whole, the operations amount to 25× interpolation pixels.

SUMMARY

According to at least one embodiment of the present invention, an image processing apparatus includes a calculation section configured to calculate filtering coefficients of a filter with a first area in an image that is partitioned into multiple first areas including the first area, the image being partitioned differently into multiple second areas, each one of which being covered by several first areas, to calculate a convoluted image of a second area using the filtering coefficients calculated with the first areas covering a part of the second area, the calculation being executed for the several first areas covering distinct parts of the second area, respectively; and an interpolation section configured to interpolate a pixel in the second area using pixels at the same position in the convoluted images of the second area which are convoluted with the respective filtering coefficients.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 1 is a schematic view illustrating an example of an optical system;

FIG. 2 is a schematic view illustrating an example of degradation of a PSF;

FIG. 11 is a schematic view illustrating a compared result of the number of product-sum operations between the first embodiment and a comparison example;

DESCRIPTION OF EMBODIMENTS

In the following, embodiments of the present invention will be described with reference to the drawings.

First Embodiment

Configuration

Figure 6:
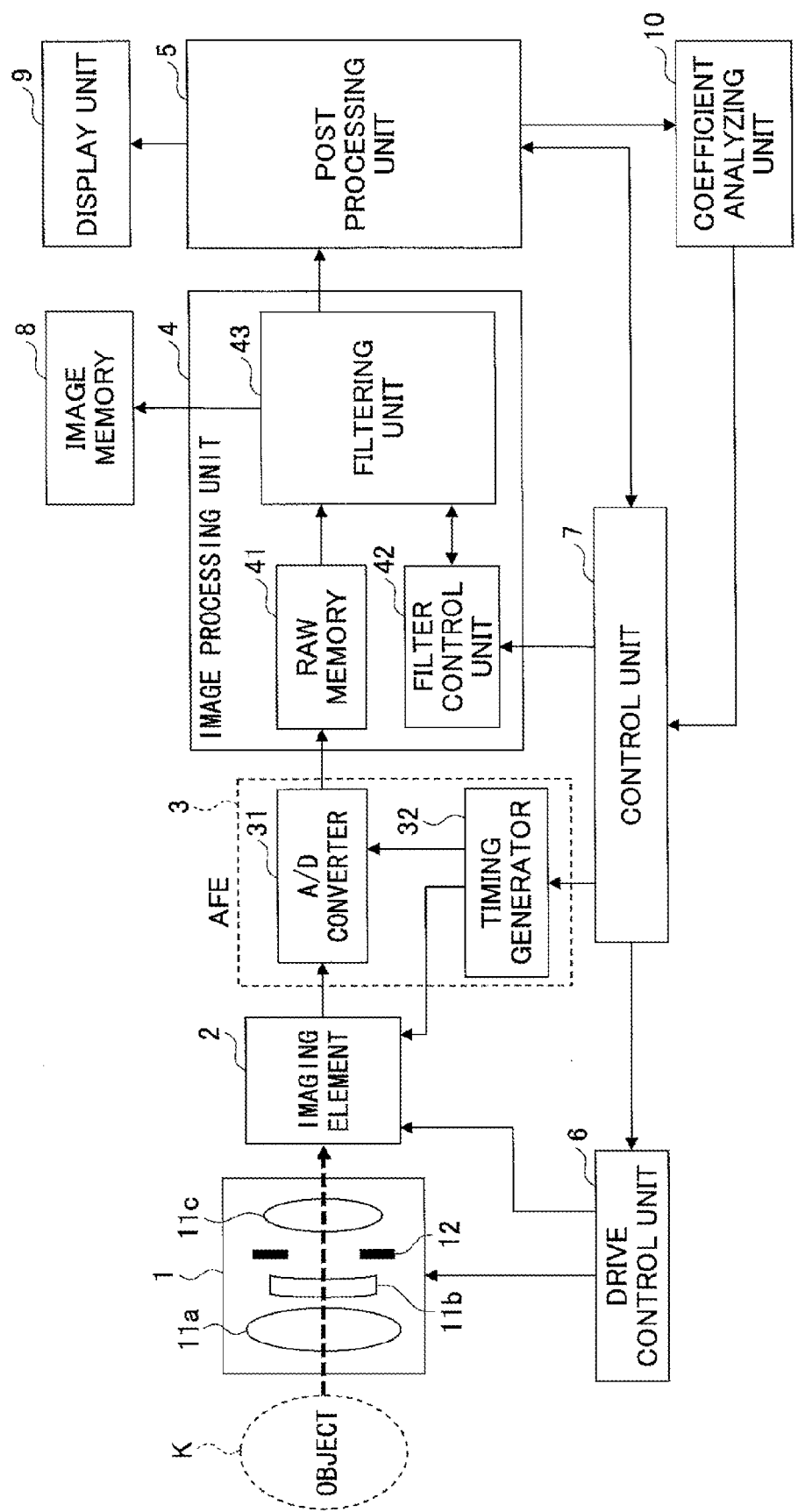
FIG. 6 is a block diagram illustrating an example of a general configuration of an image processing apparatus including an imaging device according to a first embodiment.

FIG. 6 is a block diagram illustrating an example of a general configuration of an image processing apparatus including an imaging device according to a first embodiment. The imaging device illustrated in FIG. 6 includes an optical system 1, an imaging element 2, an AFE (Analog Front End) 3, an image processing unit 4, a post processing unit 5, a drive control unit 6, a control unit 7, an image memory 8, a display unit 9, and a coefficient analyzing unit 10.

The optical system 1 collects light from an object K on an imaging plane. For example, the optical system 1 includes lenses 11a, 11b, 11c, and a diaphragm 12. The lenses 11a-11c and diaphragm 12 focus light from the object K on a capturing plane of the imaging element 2 to form an image of the object K.

The object K may have a radial pattern. By capturing the object K having a radial pattern, a spatial filter can be obtained that improves anisotropy of resolution as will be described later. Here, the object K having a radial pattern may be, for example, a Siemens star chart (also, simply called a "chart").

The drive control unit 6 controls positions of the lenses 11a-11c, opening of the diaphragm 12, and the like. Here, the configuration of the optical system 1 is not limited to a specific one.

The imaging element 2 converts light from the object K collected by the optical system 1 into an electronic signal (analog signal). The imaging element 2 includes, for example, a two dimensional imaging element such as CCD or CMOS, and the imaging element converts an image of the object into an electronic signal (image signal) to be output to the AFE 3.

The AFE 3 converts the analog signal of the captured image into a digital signal. The AFE 3 includes, for example, an A/D (analog to digital) converter 31 and a timing generator 32. The timing generator 32 generates a timing pulse used for driving the imaging element 2 based on a control signal from the control unit 7, to output the pulse to the imaging element 2 and the A/D converter 31.

The image processing unit 4 includes a RAW memory 41, a filter control unit 42, and a filtering unit 43. The RAW memory 41 stores, for example, an image (RAW image) that has been converted into the digital signal by the A/D converter 31. The image processing unit 4 may apply a predetermined process to the RAW image. The image having the predetermined process applied is recorded in the image memory 8.

The filter control unit 42 holds a filter table generated as will be described later, or set in advance. Referring to the filter table, the filter control unit 42 identifies a filter associated with the position of an image to be processed, and outputs the filter to the filtering unit 43. Namely, the filter control unit 42 outputs a filter associated with each position in the image to be processed to the filtering unit 43.

Using the filter obtained from the filter control unit 42, the filtering unit 43 executes filtering at the corresponding image position. In this way, anisotropy of resolution that depends on a position of an image can be improved along with picture quality.

Also, the filtering unit 43 does not use a single filter for each pixel in the area of the image, but uses neighboring filters to apply linear interpolation to obtain the pixel value of a pixel to be processed. Details of interpolation will be described later.

To an image having predetermined processing applied, the post processing unit 5 further applies additional processing to generate an image to be displayed. For example, the post processing unit 5 reads the image having the predetermined processing applied from the image memory 8, applies the additional processing to the image to generate an image to be displayed, and outputs the image to the display unit 9.

The image memory 8 stores an image having the predetermined processing applied. The display unit 9 includes, for example, a VRAM for recording an image and a display for outputting the image in the VRAM. Here, the imaging device may not necessarily include a display function, but may have a recording section (for example, VRAM or the like) to record an image to be displayed, instead of the display unit 9.

The drive control unit 6 controls the optical system 1. The control unit 7 controls the AFE 3 and the post processing unit 5.

The coefficient analyzing unit 10 analyzes resolution in each direction at each position of an image in which, for example, a chart is captured, and determines appropriate filter data for improving anisotropy of resolution. Details of the coefficient analyzing unit 10 will be described later.

Filter data may be, for example, a deconvolution kernel, which is a set of parameters required for filtering to compensate an image. Specifically, a deconvolution kernel can be represented by an area in which an image of a circular or elliptical object corresponding to a PSF is distributed, and data that represents weights of pixels in the area (such data is called "deconvolution distribution"). Filters based on the filter data at positions of the image may be stored into the filter control unit 42 via the control unit 7.

Here, filters that depend on positions in an image may be generated based on lens data as disclosed in Japanese Laid-open Patent Publication No. 2012-23498. In this case, the coefficient analyzing unit 10 does not need to be provided.

(Configuration for Interpolation)

Figure 7:
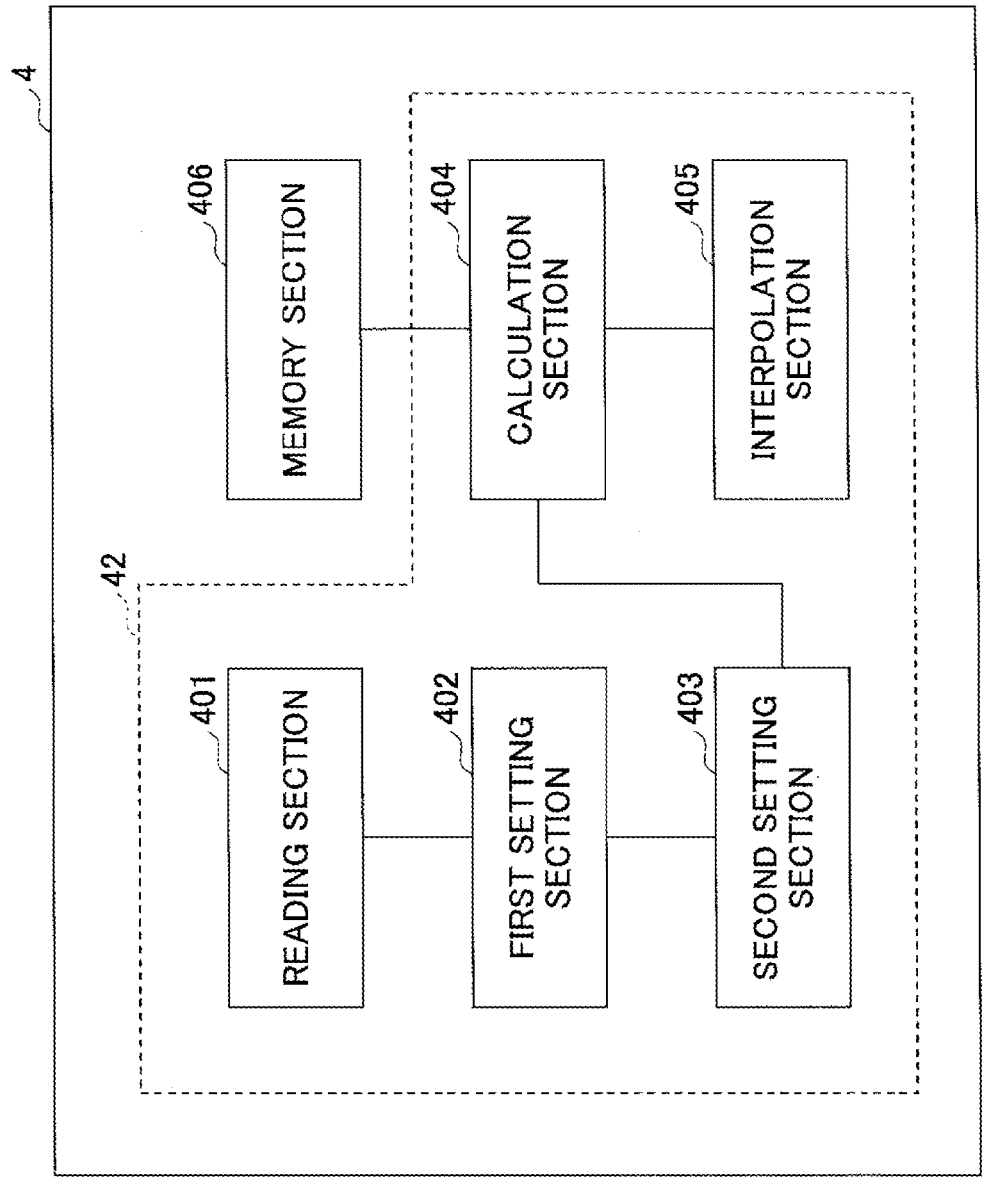
FIG. 7 is a block diagram illustrating an example of a configuration for interpolation according to the first embodiment.

FIG. 7 is a block diagram illustrating an example of a configuration for interpolation according to the first embodiment. In an example illustrated in FIG. 7, the image processing unit 4 includes a reading section 401, a first setting section 402, a second setting section 403, a calculation section 404, an interpolation section 405, and a memory section 406.

Here, the reading section 401, the first setting section 402, the second setting section 403, the calculation section 404, and the interpolation section 405 may be implemented by, for example, the filtering unit 42. Also, the memory section 406 may be implemented by, for example, the filter control unit 42.

The reading section 401 reads an image, for example, from the RAW memory 41 to output the image to the first setting section 402.

The first setting section 402 sets first areas on the obtained image. A first area is provided for calculating filtering coefficients applicable to the area. A first area has a size of, for example, a Siemens star chart.

The second setting section 403 sets a second area that is enclosed by arbitrary points in first areas. A second area is a unit area to be applied with interpolation. An arbitrary point may be, for example, the center position of a Siemens star chart. It is desirable that a second area has a rectangular shape.

Figure 8:
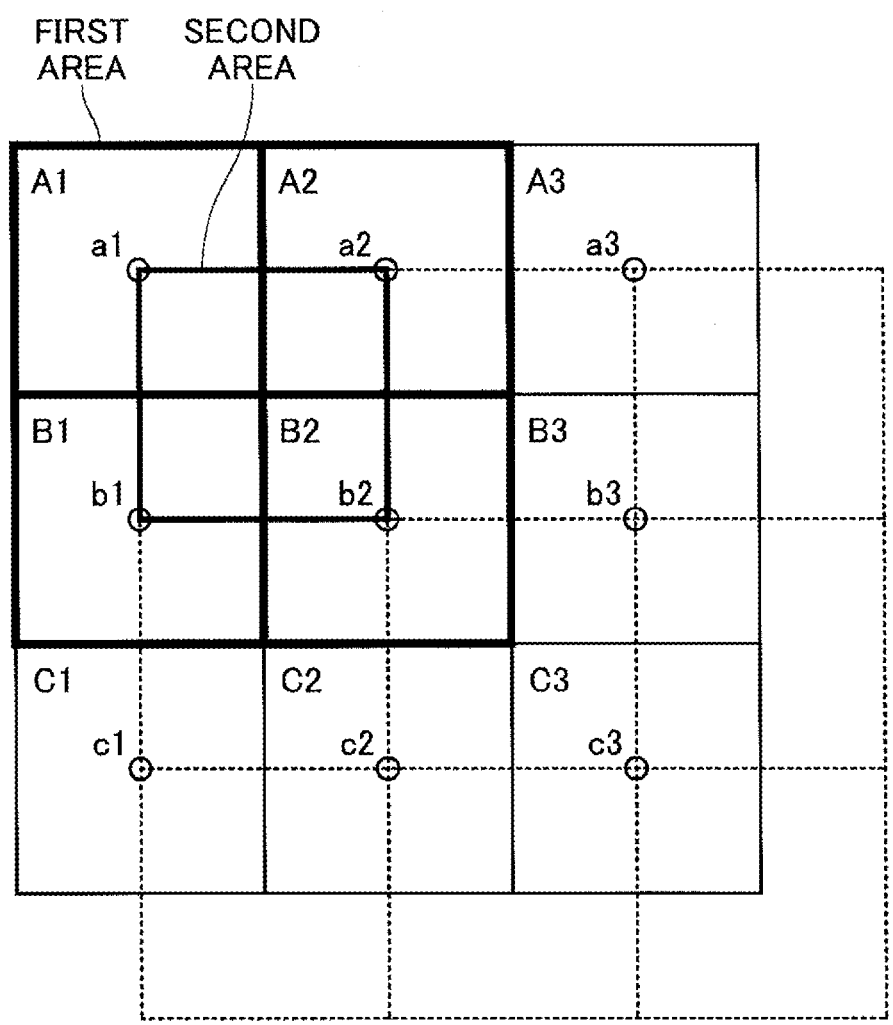
FIG. 8 is a schematic view illustrating a relationship between first areas and second areas.

FIG. 8 is a schematic view illustrating a relationship between first areas and second areas. Areas A1-C3 illustrated in FIG. 8 represent first areas, points a1-c3 represent arbitrary points (also called "sample points"), and areas enclosed by the points a1-c3 represent second areas.

Referring to FIG. 7 again, the calculation section 404 applies convolution to a second area using filtering coefficients associated with multiple first areas that include distinct parts of the second area, respectively.

For example, for the second area enclosed by the points a1-b2, the calculation section 404 obtains filtering coefficients associated with the points a1-b2, respectively, from the memory section 406. The calculation section 404 applies convolution to the second area using the filtering coefficients associated with the point a1 to generate an image UL. The calculation section 404 applies convolution to the second area using the filtering coefficient associated with the point a2 to generate an image UR.

The calculation section 404 applies convolution to the second area using the filtering coefficient associated with the point b1 to generate an image DL. The calculation section 404 applies convolution to the second area using the filtering coefficient associated with the point b2 to generate an image DR. The calculation section 404 outputs the four images to the interpolation section 405 that has been obtained with convolution using the filtering coefficients.

Figure 9:
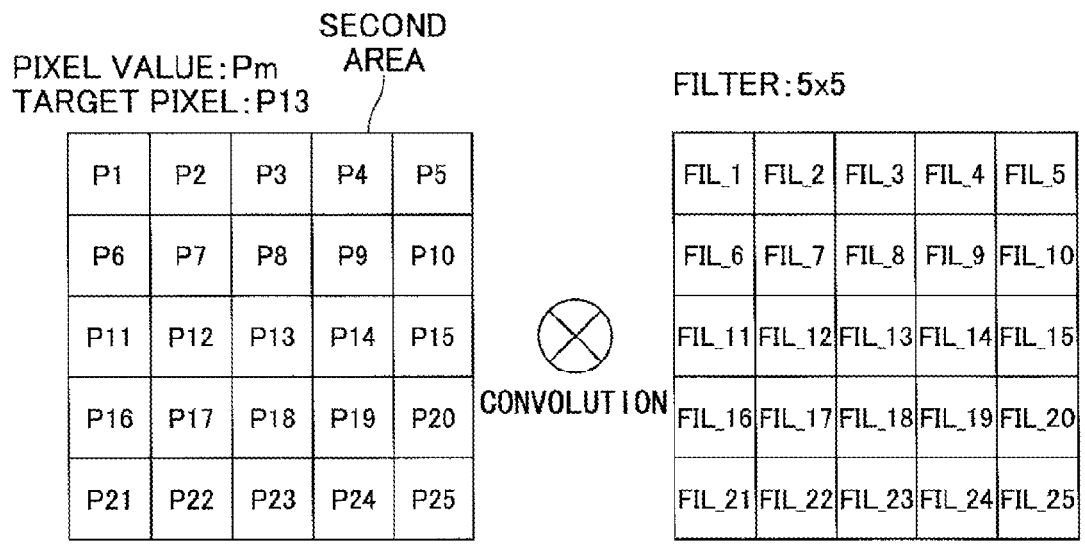
FIG. 9 is a schematic view illustrating convolution calculation.

FIG. 9 is a schematic view illustrating convolution. Pm illustrated in FIG. 9 represent pixel values. In an example illustrated in FIG. 9, P13 is assumed to be a pixel applied with convolution. Also, FIL_1-FIL_25 represent filtering coefficients. Here, denoting the pixel after convolution by P13', P13' is represented by the following formula (1).

$$P'_{13} = \sum_{m=1}^{25} P_m FIL\_m \qquad \text{formula (1)}$$

Using substantially the same formulas as formula (1), the calculation section 404 obtains pixels having applied with convolution. Here, each of the points a1-b2 has its own coefficients FIL_1-FIL_25 that are different from the coefficients of the other points.

Referring to FIG. 7 again, the interpolation section 405 interpolates pixels in the second area using pixels at the same position in the images having been applied with convolution using the respective filtering coefficients to generate an image of the second area. The interpolation section 405 moves, for example, the pixel at the same position to the pixel position of the arbitrary point of a first area that has filtering coefficients used for calculating the pixel. Using the moved pixels, the interpolation section 405 applies bilinear interpolation to calculate the pixel in the second area.

For example, the interpolation section 405 moves the pixel in the convoluted image of the second area obtained with the filtering coefficients for the point a1 to the pixel position of the point a1. Similarly, the interpolation section 405 moves the pixels in the convoluted images of the second area obtained with the filtering coefficients for the points a2-b2 to the pixel position of the points a2-b2, respectively. The process of the interpolation section 405 will be concretely described using FIG. 10.

Figure 10:
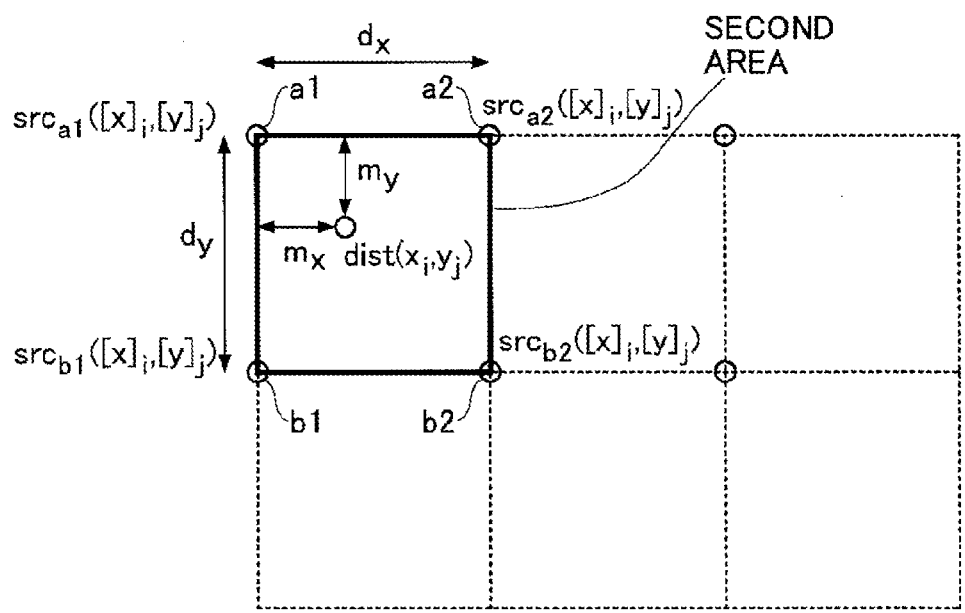
FIG. 10 is a schematic view illustrating interpolation.

FIG. 10 is a schematic view illustrating interpolation. In FIG. 10, the interpolation section 405 is to obtain a pixel value dist $(x_i, y_i)$ positioned at a point $(x_i, y_i)$ by interpolation.

First, the calculation section 404 calculates a pixel value $src_{a1}(x_i, y_i)$ at $(x_i, y_i)$ using the filtering coefficients of a1, and a pixel value $src_{a2}(x_i, y_i)$ at $(x_i, y_i)$ using the filtering coefficient of a2. Similarly, the calculation section 404 calculates a pixel value $src_{b1}(x_i, y_i)$ at $(x_i, y_i)$ using the filtering coefficients of b1, and a pixel value $src_{b2}(x_i, y_i)$ at $(x_i, y_i)$ using the filtering coefficients of b2.

Next, the interpolation section 405 moves $src_{a1}(x_i, y_i)$ calculated using the filtering coefficients of a1 to the position of a1. Similarly, the interpolation section 405 moves $src_{a2}(x_i, y_i)$ to the position of a2, $src_{b1}(x_i, y_i)$ to the position of b1, and $src_{b2}(x_i, y_i)$ to the position of b2, respectively.

Then, the interpolation section 405 obtains the pixel value dist $(x_i, y_i)$ positioned at $(x_i, y_i)$ using the pixel values at the positions of a1-b2 after movement, by bilinear interpolation with formula (2).

$$dist(x_i, y_i) = src_{a1}([x]_i, [y]_j) \cdot (d_x - m_x) \cdot (d_y - m_y) + $$
$$src_{a2}([x]_i, [y]_j) \cdot m_x \cdot (d_y - m_y) + $$
$$src_{b1}([x]_i, [y]_j) \cdot (d_x - m_x) \cdot m_y + src_{b2}([x]_i, [y]_j) \cdot m_x \cdot m_y$$

formula (2)

The interpolation section 405 calculates pixels in the second area using formula (2). This makes it possible to make the amount of calculation less than a method that interpolates filtering coefficients themselves at pixel positions in the second area, and uses the interpolated filtering coefficients for convolution.

Here, for further reducing the amount of calculation, the interpolation section 405 may set the average of $src_{a1}(x_i, y_i)$, $src_{a2}(x_i, y_i)$, $src_{b1}(x_i, y_i)$, and $src_{b2}(x_i, y_i)$ to dist $(x_i, y_i)$ By applying the same process to all second areas, the interpolation section 405 can generate a compensated image. The compensated image is output to the image memory 8 and the post processing unit 5.

<Effects>

Figure 3:
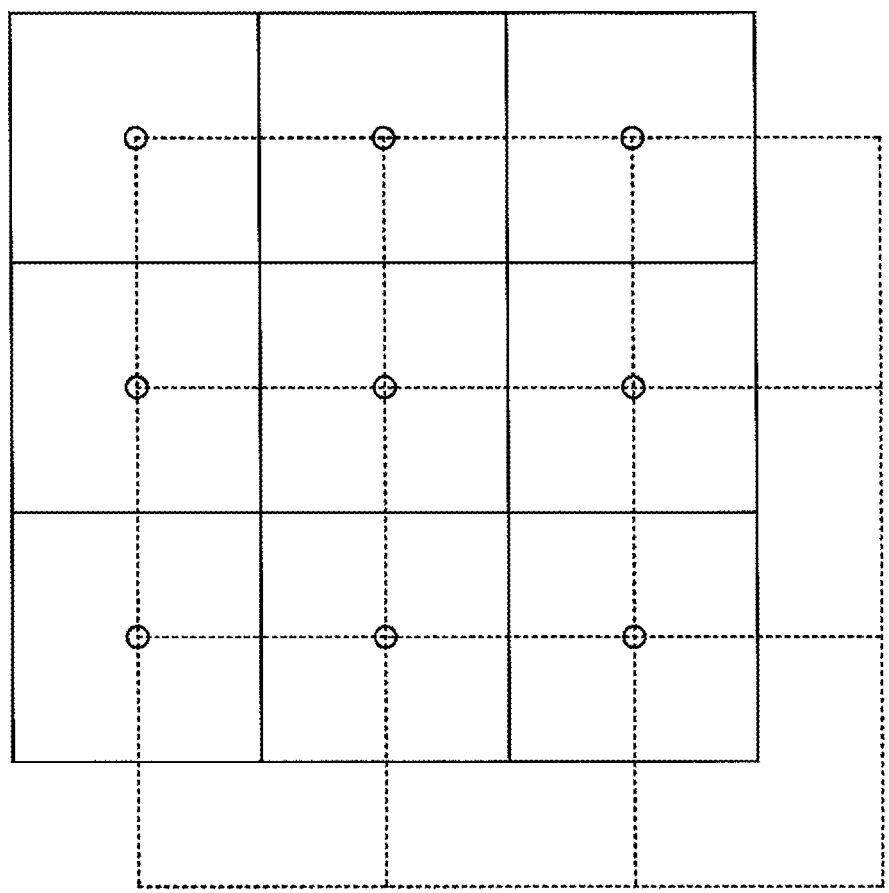
FIG. 3 is a schematic view illustrating interpolation of pixel values.
Figure 4:
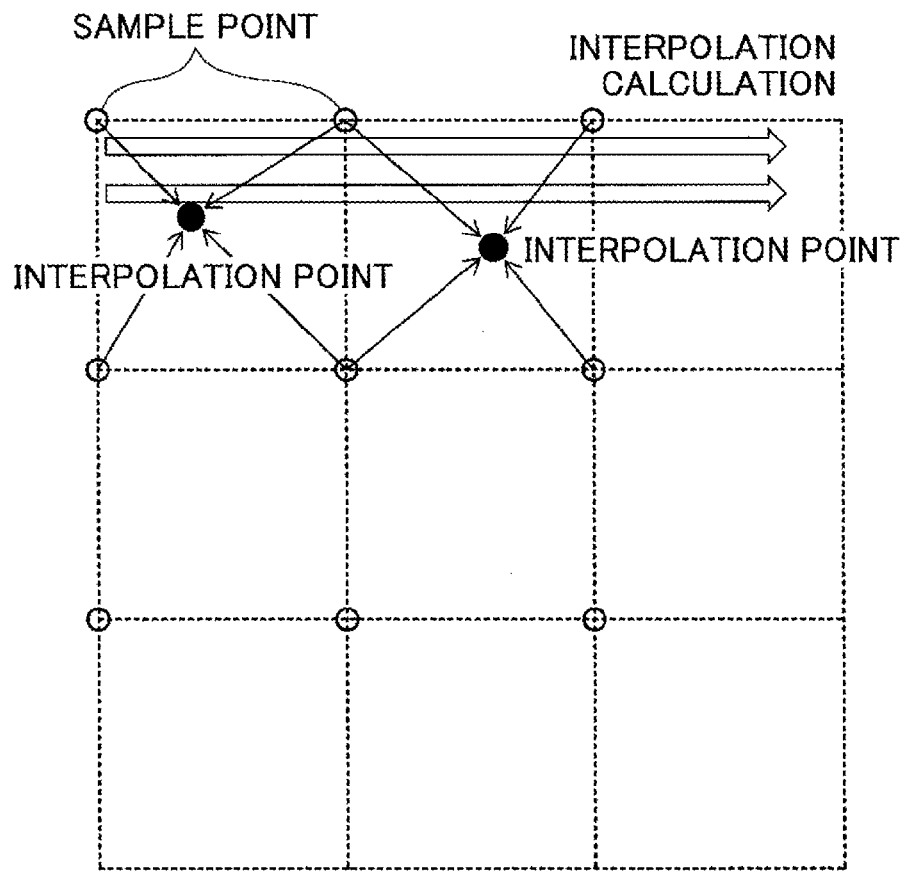
FIG. 4 is another schematic view further illustrating interpolation of pixel values.
Figure 5:
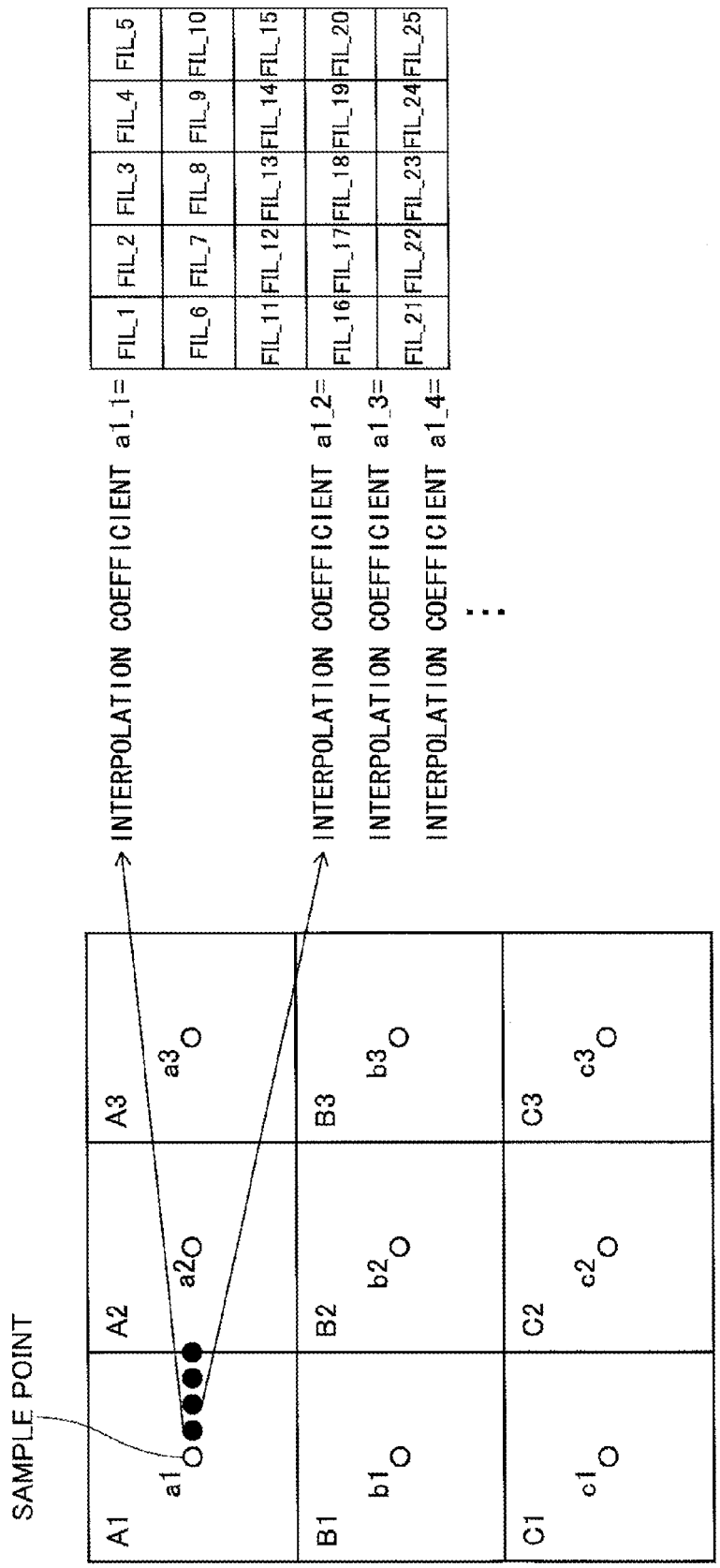
FIG. 5 is a schematic view illustrating a problem of a conventional technology.

Next, a calculation result according to the first embodiment and a calculation result according to a comparison example will be compared. Here, the comparison example interpolates filtering coefficients at pixel positions (for example, 5×5), and uses the interpolated filtering coefficients for a convolution operation (see, for example, FIG. 5). In an example illustrated in FIG. 11, the numbers of operations are compared that are required for interpolating a pixel value using 5×5 filters.

Also, the number of product-sum operations for interpolation is set to 15 (see formula (2)), the number of operations for convolution is set to 49 (=25+24) (see formula (1)).

FIG. 11 is a schematic view illustrating a compared result of the number of product-sum operations between the first embodiment and the comparison example. As illustrated in FIG. 11, interpolation is executed 25 times according to the comparison example because it is repeated for the number of filtering coefficients, and convolution is executed once. Therefore, the total number of product-sum operations is 424 in the comparison example as obtained by formula (3).

15×25+49×1=424    formula (3)

On the other hand, interpolation is executed once and convolution is executed four times according to the first embodiment. Therefore, the total number of product-sum operations is 211 in the first embodiment as obtained by formula (4).

15×1+49×4=211    formula (4)

Figure 12:
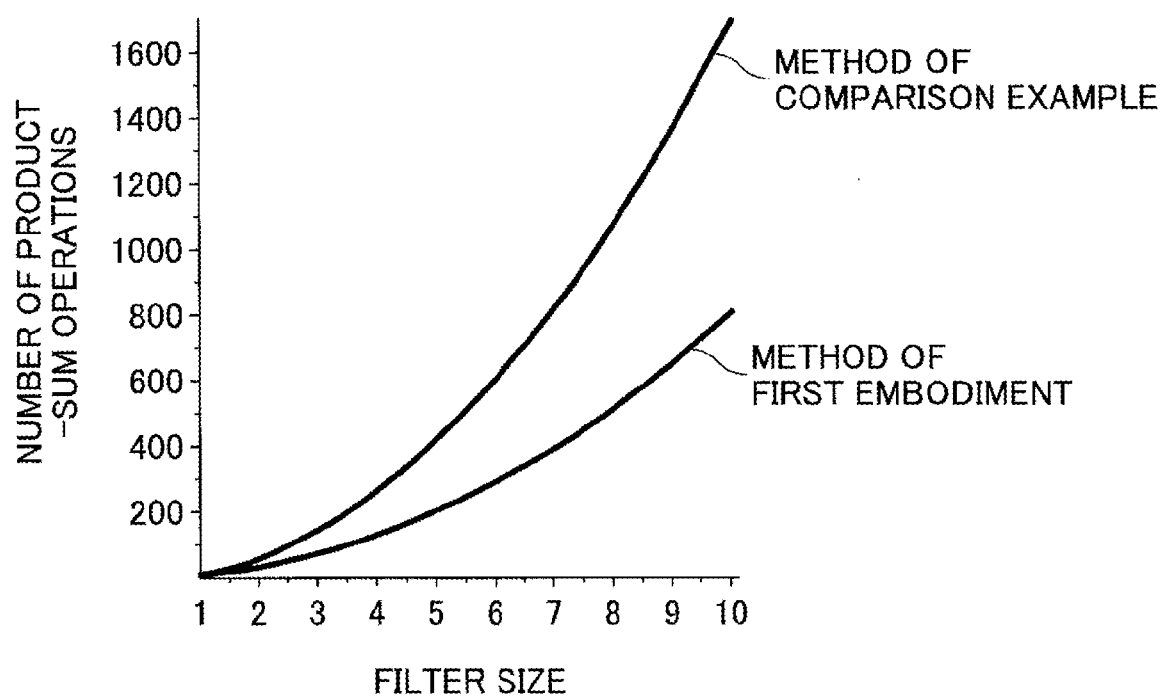
FIG. 12 is a schematic view illustrating that the number of product-sum operations depend on a filter size.

FIG. 12 is a schematic view illustrating that the number of product-sum operations increases with a filter size. As illustrated in FIG. 12, the number of product-sum operations with the method according to the first embodiment increases less than with the method according to the comparison example. Also, the method according to the first embodiment has an effect that reduces the number of operations to a half of that of the method according to the comparison example.

Figure 13:
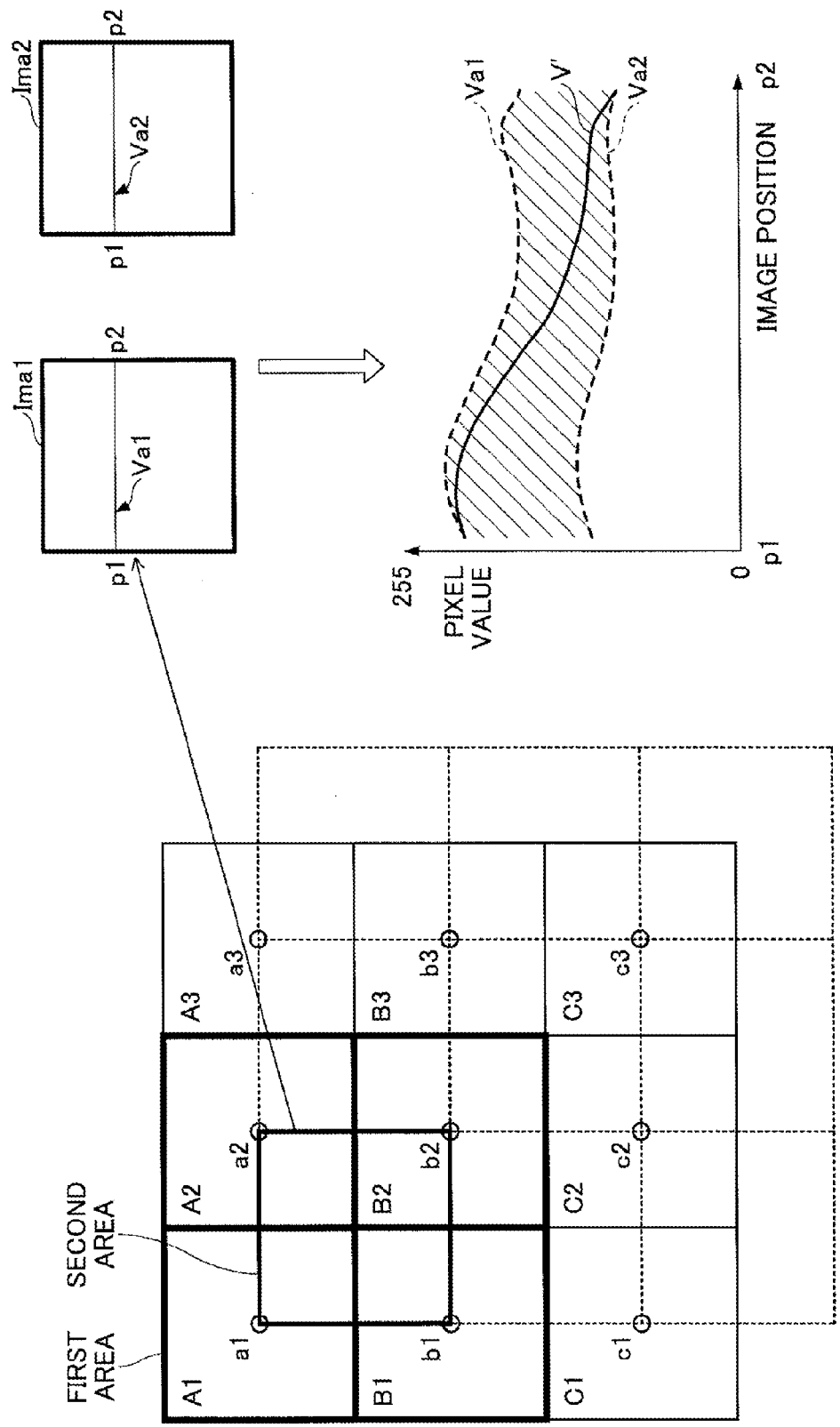
FIG. 13 is a schematic view illustrating picture quality of the comparison example and the first embodiment.

FIG. 13 is a schematic view illustrating picture quality of the comparison example and the first embodiment. With reference to FIG. 13, it will be described that the method according to the first embodiment does not have much difference with the comparison example in terms of picture quality, taking a horizontally-directed one-dimensional piece of an image as an example.

In FIG. 13, an image Ima1 represents an image that is obtained by applying convolution to the second area (a1-b2) using the filtering coefficients of a1. Also, an image Ima2 represents an image that is obtained by applying convolution to the second area (a1-b2) using the filtering coefficients of a2.

Pixel values Va1 and Va2 illustrated in FIG. 13 represent pixel values between p1 and p2 in the image Ima1 and the image Ima2, respectively, where p1's and p2's are positioned at the same positions in the respective images.

Assume that curves illustrated in FIG. 13 are obtained for Va1 and Va2 when drawing graphs. With the method of the comparison example, in which filtering coefficients are interpolated first, pixel values of a filtered (convoluted) image may be included in a part designated with slanting lines in FIG. 13.

On the other hand, pixel values of an image obtained with the method of the first embodiment may be represented by a solid curve V' in FIG. 13 due to linear interpolation. Therefore, although the filtered images obtained with the comparison example and the first embodiment, respectively, have difference within the range of the part designated with slanting lines, it may be too subtle to be recognized with visual inspection.

Thus, having the configuration according to the first embodiment, it is possible to reduce the amount of calculation by using different filters for areas to generate a compensated image by interpolating pixels other than the arbitrary pixels of the areas while avoiding degradation of picture quality.

<Filter>

Next, it will be described how to obtain a filter whose filtering coefficients are dependent on a position in an image according to the first embodiment. In an example described below, calculation steps will be described for a filter that improves anisotropy of resolution, for example, by adjusting in a direction with inferior resolution. It is noted that the example described below is taken for an explanatory purpose, and a filter may be obtained with other ways. In the following, a filter is also called an "inverse filter".

First, to compensate an image for defocus including resolution degradation, there is a compensation method using a point spread function (PSF). A PSF is a function representing, for example, defocus. In the following, a function representing defocus may also be called a "defocus function".

A defocus image y can be represented by convolution of an original image x and a PSF k as follows.

$$y = k \otimes x$$

formula (5)

$\otimes$ : convolution

Considering an original image x, a PSF k, and a defocus image y as in formula (5), an image close to the original image x can be obtained by making formula (6) take a minimum value, which is an inverse problem.

$$\|y - k \otimes x\|^2 \quad \text{formula (6)}$$

When solving an inverse problem, a regularization term is usually added as in formula (7) to obtain a solution for the inverse problem.

$$\|y - k \otimes x\|^2 + \epsilon E(x) \quad \text{formula (7)}$$

For the current problem, regularization terms are added that represent differential terms in the horizontal and vertical directions of the image because directivity needs to be taken into account.

$$\|y - k \otimes x\|^2 + \epsilon \{\|d_m \otimes x\|^2 + \|d_n \otimes x\|^2\} \quad \text{formula (8)}$$

$\epsilon$: weight coefficient
$d_m$, $d_n$: differential filters for the horizontal and vertical (row and column) directions, respectively $$d_m = [-1 \ 1]$$

$$d_n = \begin{bmatrix} -1 \\ 1 \end{bmatrix}$$

A minimum value of formula (8) can be obtained by partially-differentiating formula (8) with x, equating the result with 0, and solving it for x. Applying Fourier transform first and solving it with X ($\omega$), the following formula (9) is obtained.

$$X(\omega) = \frac{K(\omega)Y(\omega)}{K(\omega)^2 + \varepsilon\{D_m(\omega)^2 + D_n(\omega)^2\}} \quad \text{formula (9)}$$

where X ($\omega$), Y ($\omega$), K ($\omega$), $D_m$ ($\omega$), and $D_n$ ($\omega$) represent Fourier-transformed x, y, k, $d_m$, and $d_n$, respectively.

In the frequency domain, an inverse filter $K_{inv}$ ($\omega$) satisfies formula (10).

$$X(\omega) = K_{inv}(\omega) Y(\omega) \quad \text{formula (10)}$$

Therefore, the inverse filter $K_{inv}$ ($\omega$) satisfies next formula (11).

$$K_{inv}(\omega) = \frac{K(\omega)}{K(\omega)^2 + \varepsilon\{D_m(\omega)^2 + D_n(\omega)^2\}} \quad \text{formula (11)}$$

Formula (11) is transformed into formula (12) using conjugate complex.

$$K_{inv}(\omega) = \frac{\overline{K(\omega)}}{K(\omega)\overline{K(\omega)} + \varepsilon\{D_m(\omega)\overline{D_m(\omega)} + D_n(\omega)\overline{D_n(\omega)}\}} \quad \text{formula (12)}$$

$\overline{K(\omega)}$: conjugate complex

According to the first embodiment, a direction with low resolution is adjusted by rotating axes of differential coefficients by an angle $\theta$ using a rotation matrix.

$$D_X(\omega, \theta) = D_m(\omega)\cos\theta - D_n(\omega)\sin\theta \quad \text{formula (13)}$$

$$D_Y(\omega, \theta) = D_m(\omega)\sin\theta + D_n(\omega)\cos\theta \quad \text{formula (14)}$$

Using such a rotation matrix, directivity can be taken into consideration.

Figure 14:
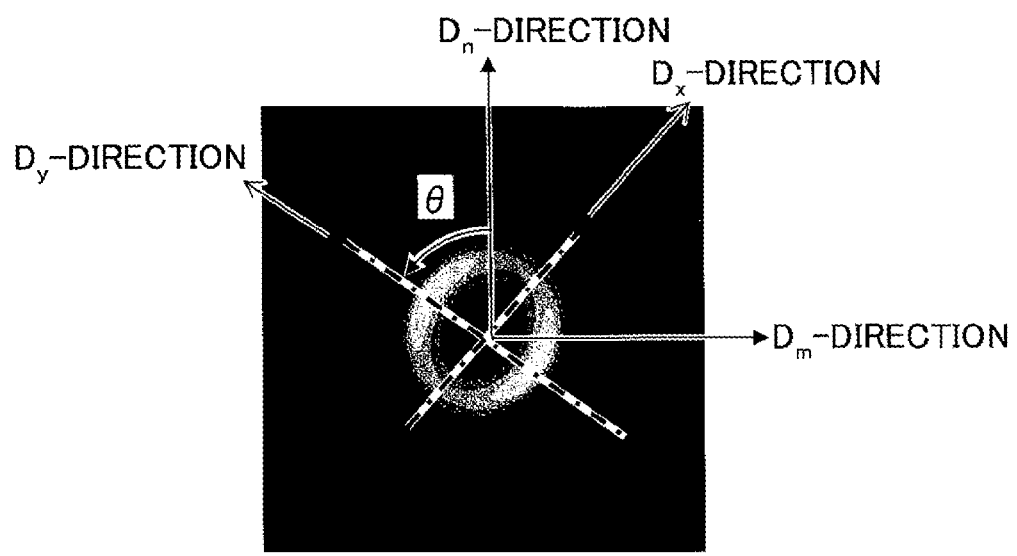
FIG. 14 is a schematic view illustrating rotation.

FIG. 14 is a schematic view illustrating rotation. In a example illustrated in FIG. 14, $D_n$ direction is rotated by $\theta$ to be $D_y$ direction, and Dm direction is rotated by $\theta$ to be $D_x$ direction.

Here, assume a PSF of an ellipse is k (r,$\theta$), and a PSF of the ellipse after Fourier transform is K ($\omega$,$\theta$)=fk (r,$\theta$). By substituting formula (12) with formulas (13)-(14) and K ($\omega$,$\theta$), and adding a weight coefficient $\gamma$ for direction, formula (15) obtained.

$$K_{inv}(\omega, \theta) = \frac{\overline{K(\omega, \theta)}}{K(\omega, \theta)\overline{K(\omega, \theta)} + \varepsilon\{D_X(\omega, \theta)\overline{D_X(\omega, \theta)} + \gamma D_Y(\omega, \theta)\overline{D_Y(\omega, \theta)}\}} \quad \text{formula (15)}$$

$\gamma$: weight coefficient for direction in the inverse filter
$\epsilon$: overall weight coefficient With formula (15), the weights can be adjusted for direction in the inverse filter according to the first embodiment. For example, the coefficient analyzing unit 10 adjusts the weight $\gamma$ for a low-resolution direction (for example, $D_y$ direction). By making the weight coefficient $\gamma$ small, the low-resolution direction can be improved.

Figure 15:
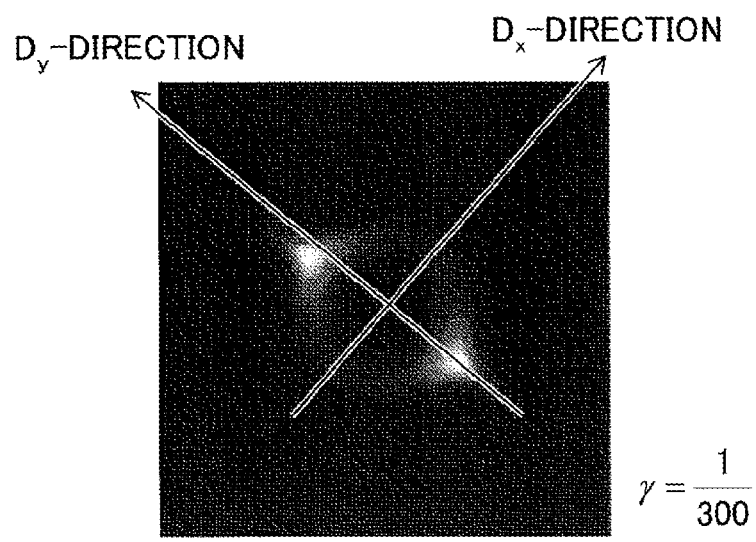
FIG. 15 is a schematic view illustrating an example of two dimensional distribution of spatial frequency of an inverse filter $K_{inv}$.

FIG. 15 is a schematic view illustrating an example of two dimensional distribution of spatial frequency of an inverse filter $K_{inv}$. An example in FIG. 15 illustrates two dimensional distribution with $\gamma$=1/300. In this case, the weight coefficients $\gamma$ and $\epsilon$ (especially, $\gamma$) are determined so that resolution is improved in $D_y$ direction more than in $D_x$ direction.

Figure 16:
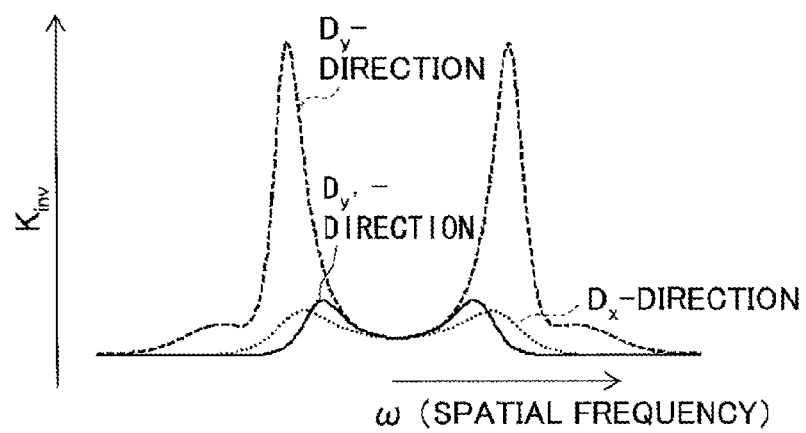
FIG. 16 is a schematic view illustrating an example of distribution of the inverse filter $K_{inv}$ in the spatial frequency direction.

FIG. 16 is a schematic view illustrating an example of distribution of the inverse filter $K_{inv}$ in the spatial frequency direction. FIG. 16 illustrates that $D_y$ direction is improved by making the weight coefficient in $D_y$ direction small, when compared with $D_{y'}$ that represents distribution with $\gamma$=1. Thus, according to the first embodiment, weight coefficients can have anisotropy to be multiplied with filter parameters of an inverse filter.

(Coefficient Analyzing Unit)

Next, the coefficient analyzing unit 10 will be described. The coefficient analyzing unit 10 determines filter data to improve anisotropy of resolution.

Figure 17:
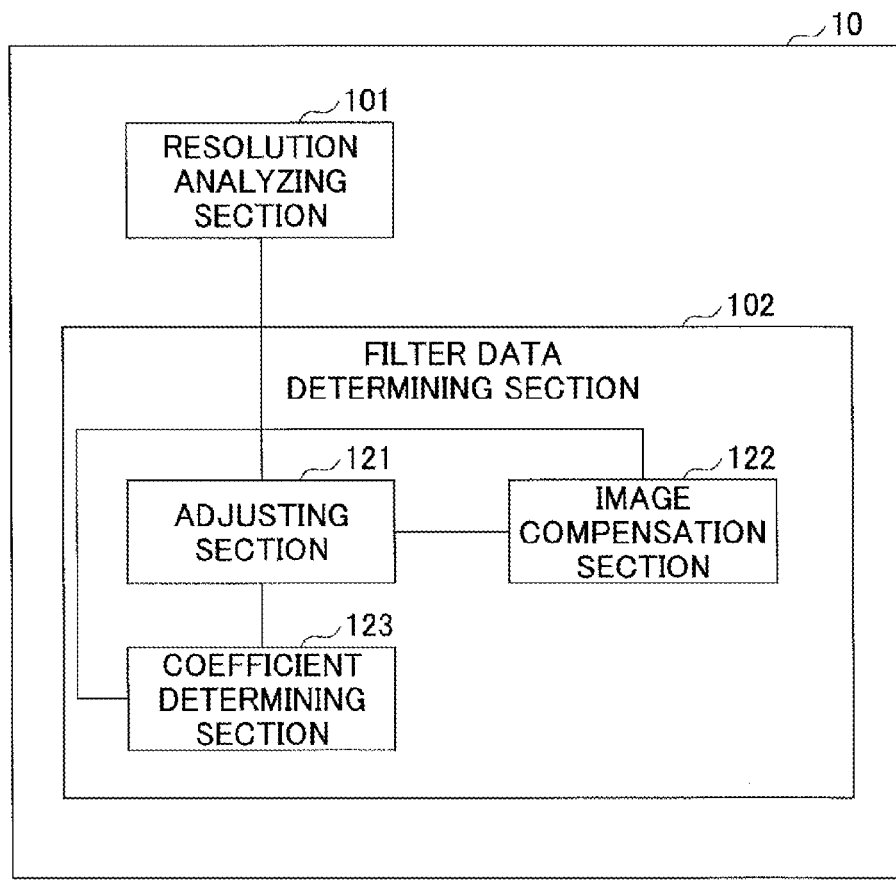
FIG. 17 is a block diagram illustrating an example of a function of a coefficient analyzing unit according to the first embodiment.

FIG. 17 is a block diagram illustrating an example of a function of the coefficient analyzing unit 10 according to the first embodiment. The coefficient analyzing unit 10 illustrated in FIG. 17 includes a resolution analyzing section 101 and a filter data determining section 102. The coefficient analyzing unit 10 executes coefficient analysis on an image that captures a chart image. In an example described below, coefficient analysis is executed, for example, with a wedge-shaped image captured at an upper-left position in a larger image. Alternatively, coefficient analysis may be executed with multiple wedge-shaped images at predetermined positions in the larger image.

The resolution analyzing section 101 analyzes resolution degradation of an image in at least two directions that captures an object with a radial pattern. Analysis can be executed by analyzing an MTF (Modulation Transfer Function) depending on direction.

The resolution analyzing section 101 obtains an MTF by taking the number of lines per pixel in the horizontal axis and amplitude strength in the vertical axis. The number of lines per pixel may be substituted by the number of lines per unit length at the distance where an actual object is located.

According to the first embodiment, a wedge-shaped radial chart is used, which enables an analysis of MTF depending on direction.

Figure 18:
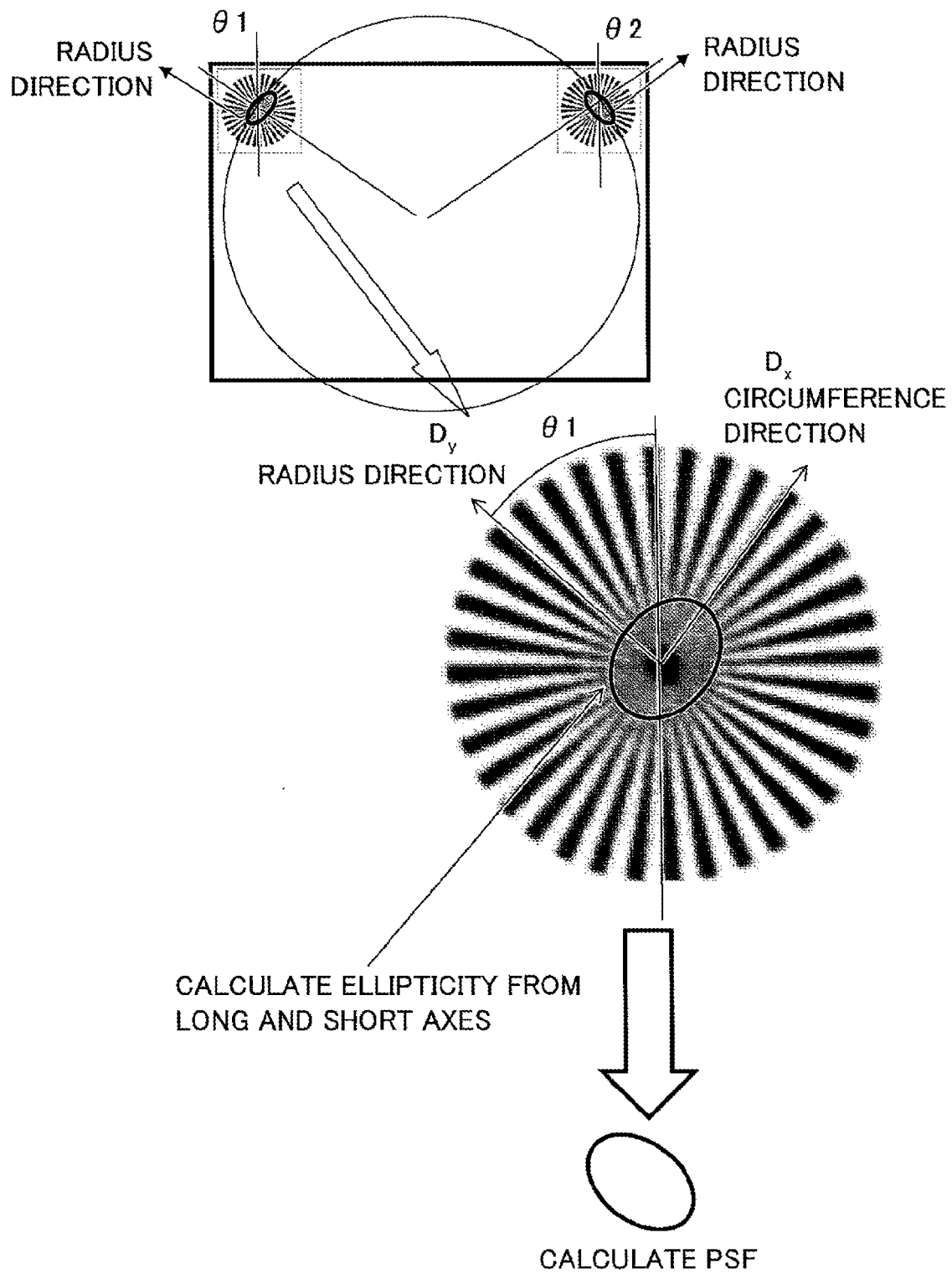
FIG. 18 is a schematic view illustrating steps for calculating a PSF.

FIG. 18 is a schematic view illustrating steps for calculating a PSF. In an example illustrated in FIG. 18, the filter data determining section 102 first calculates an angle determined by the position of the image and ellipticity. The filter data determining section 102 obtains an ellipse by making a contour of a predetermined threshold value (about half of the maximum amplitude) with MTFs calculated for predetermined angles, respectively.

The filter data determining section 102 calculates ellipticity from the long axis and the short axis of the obtained ellipse. The filter data determining section 102 geometrically calculates an angle θ1 based on the position of the image. Alternatively, the filter data determining section 102 may calculate the angle θ1 from the long and short axes of the ellipse representing resolution. By calculating the angle θ1 from the long and short axes, the angle may be calculated with taking an actual degree of defocus into consideration. Here, defocus is greater in a radius direction where the radius is of a circle around the optical axis center.

The filter data determining section 102 may calculate an angle between, for example, the vertical direction and the radius direction. Here, although the optical axis center is basically coincident with the image center, it may be shifted due to a shift of the lens position. The filter data determining section 102 determines the PSF from the calculated ellipticity and angle. Here, the ellipse represented by the PSF is rotated 90 degrees from the direction of the ellipse obtained with the contour of the MTF.

Referring to FIG. 17 again, the filter data determining section 102 determines filter data of the inverse filter having anisotropy of resolution, based on a resolution analysis result of the image after compensation by the filter (the inverse filter above) determined by the defocus function (PSF) of the image.

Also, the filter data determining section 102 adjusts and changes the weight coefficients (for example, γ) depending on the differential direction of the image. For example, the weight coefficient in the $D_x$ direction is set to 1, and the weight coefficient in the $D_y$ direction is set to γ, which can be adjusted. In this way, anisotropy of resolution can be improved.

Also, the filter data determining section 102 determines the weight coefficients by rotating (for example, by θ) with respect to the differential direction. This makes it possible to detect a direction with low resolution for filtering.

Specifically, the filter data determining section 102 adjusts, for example, the weight coefficients ε and γ to determine appropriate weight coefficients ε and γ. The weight coefficient γ represents a weight coefficient for a filter parameter in a direction with low resolution. A filter parameter in a direction with low resolution is, for example, $D_y$ (ω, θ) to be multiplied with the weight coefficient γ in formula (15), or the conjugate complex of $D_y$ (ω, θ).

For adjusting and determining the weight coefficients, the filter data determining section 102 includes an adjusting section 121, an image compensation section 122, and a coefficient determining section 123.

The adjusting section 121 adjusts, for example, the direction-independent weight coefficient ε and the direction-dependent γ. The adjusting section 121 sets initial values to the weight coefficients ε and γ, and transfers the initial values to the image compensation section 122.

The image compensation section 122 executes image compensation with the weight coefficients obtained from the adjusting section 121. The image compensation section 122 compensates an image by filtering using the inverse filter illustrated in formula (15). The image compensation section 122 transfers the compensated image to the resolution analyzing section 101, which analyzes resolution degradation again.

Based on a resolution analysis result of the compensated image, the coefficient determining section 123 determines weight coefficients so that difference of resolution degradation between two directions becomes small. The coefficient determining section 123 holds analysis results of the image compensated with various weight coefficients, and determines weight coefficients ε and γ so that the difference of spatial frequency values becomes minimum, for example, at predetermined amplitude strength (first determination process).

Figure 19:
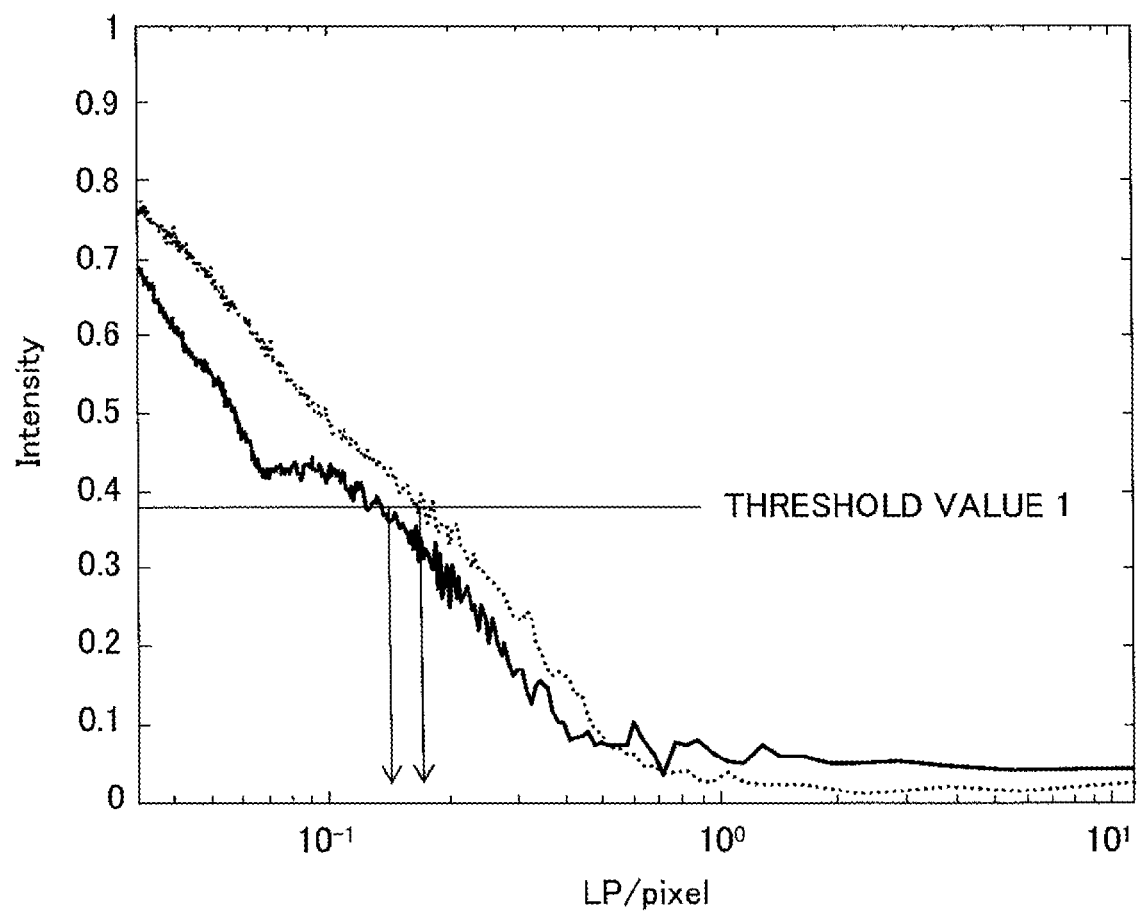
FIG. 19 is a schematic view illustrating an example of a first process for determining weight coefficients.

FIG. 19 is a schematic view illustrating an example of a first process for determining weight coefficients. As illustrated in FIG. 19, the coefficient determining section 123 determines weight coefficients ε and γ so that difference of spatial frequencies becomes minimum at predetermined amplitude strength (threshold value 1).

Alternatively, the coefficient determining section 123 may determine weight coefficients ε and γ so that the difference of amplitude strength becomes minimum at predetermined spatial frequency (second determination process).

Figure 20:
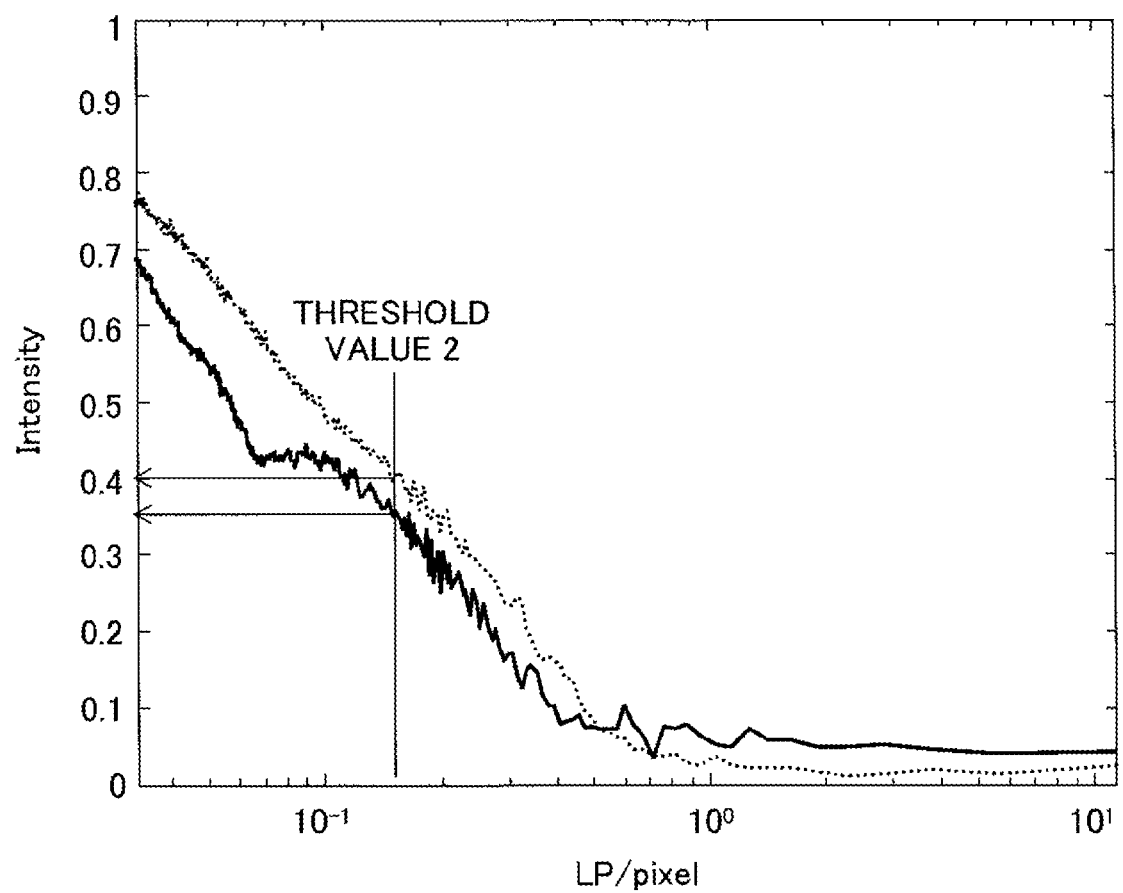
FIG. 20 is a schematic view illustrating an example of a second process for determining weight coefficients.

FIG. 20 is a schematic view illustrating an example of the second process for determining weight coefficients. As illustrated in FIG. 20, the coefficient determining section 123 determines weight coefficients ε and γ so that difference of amplitude strength becomes minimum at predetermined spatial frequency (threshold value 2).

Here, multiple threshold values 1 or multiple threshold values 2 may be provided, with which the coefficient determining section 123 may determine weight coefficients so that the least sum of squares of the difference at each threshold values is obtained. Here, the coefficient determining section 123 may determine weight coefficients so that differences are less than a predetermined threshold value. The threshold value may be set with an experiment in advance, or the like.

Also, the coefficient determining section 123 may determine weight coefficients so that a difference is less than a predetermined threshold value between a sum of squares of differences of resolution in two directions at a center part of an image and a sum of squares of differences of resolution in two directions at a peripheral part of the image. Also, the coefficient determining section 123 may determine weight coefficients so that the least sum of squares of the difference between a center part of an image and a peripheral part of the image is obtained.

This is because by making the resolution similar at a center part and a peripheral part of an image when reducing anisotropy of resolution, image resolution becomes similar on the overall image, which improves the picture quality.

In the coefficient determining section 123, minimization may be determined by a minimizing function, or by a person. Such a minimizing function may be, for example, a simplex search method, a steepest descent method, a conjugate gradient method, or the like.

The filter data determining section 102 changes weight coefficients to be adjusted, obtains an inverse filter with the adjusted weight coefficient, compensates an image with the obtained inverse filter, and determines optimal weight coefficients based on resolution analysis results of the compensated image. Adjustment of weight coefficients, calculation of an inverse filter, compensation by filtering, and resolution analysis are repeated until optimal weight coefficients are determined.

<Effect of Filter>

Figure 21:
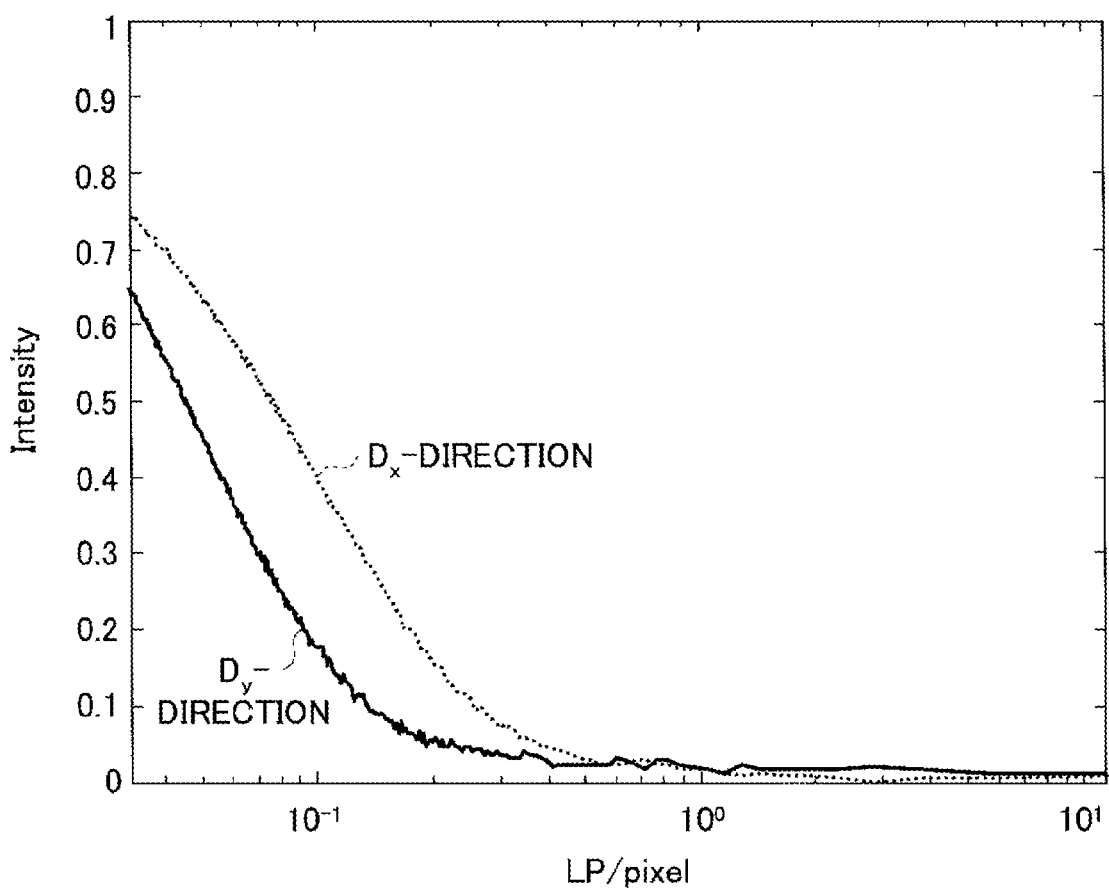
FIG. 21 is a schematic view illustrating an analyzed result of resolution before image compensation.

Next, an effect of an inverse filter having anisotropy obtained with the coefficient analyzing unit 10 will be described. FIG. 21 is a schematic view illustrating an analyzed result of resolution before image compensation. Resolution is degraded in the $D_y$ direction more than in the $D_x$ direction as the curve for the $D_y$ direction is positioned lower than the curve for the $D_x$ direction.

Figure 22:
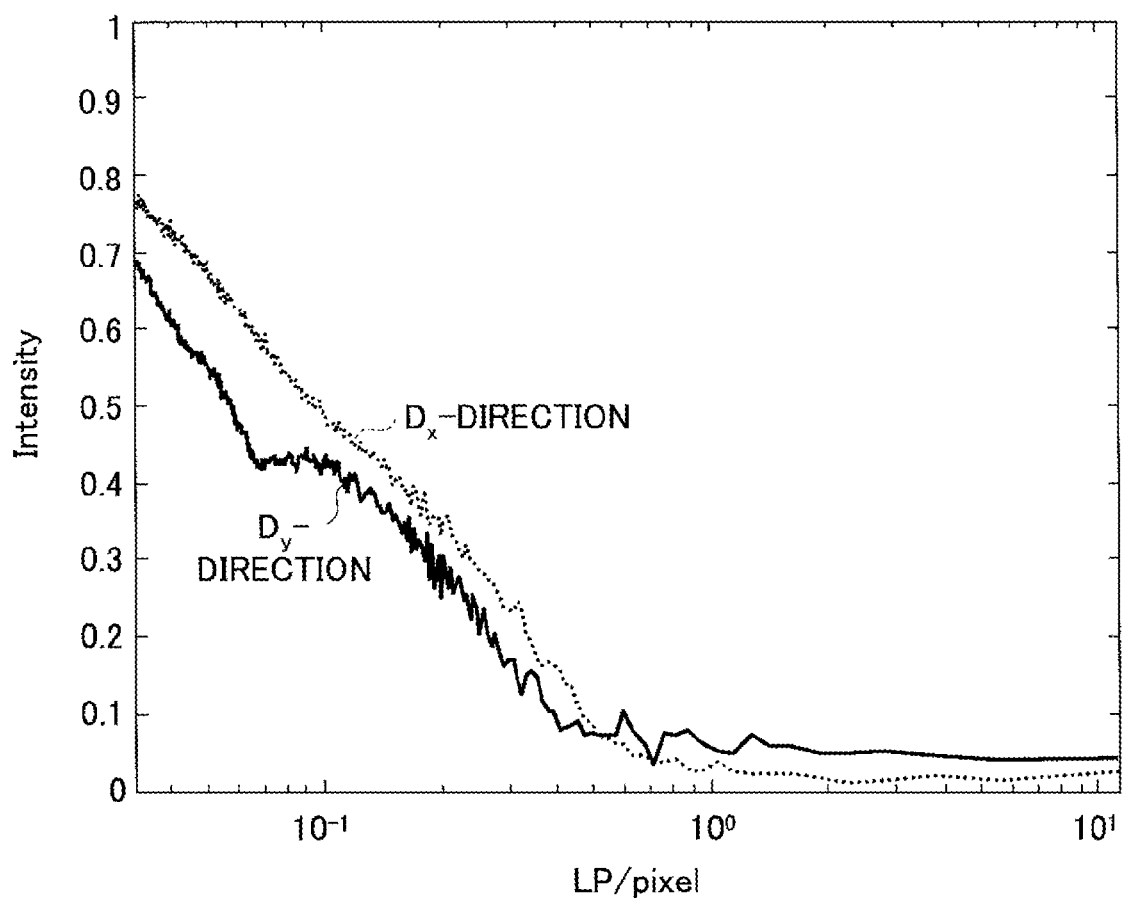
FIG. 22 is a schematic view illustrating an analyzed result of resolution after image compensation according to the first embodiment.

FIG. 22 is a schematic view illustrating an analyzed result of a resolution after image compensation according to the first embodiment. In a example illustrated in FIG. 22, γ is set to 1/300. As illustrated in FIG. 22, resolution is improved in both the $D_x$ and $D_y$ directions, and moreover, the difference between the two directions becomes less, which implies anisotropy of resolution is improved.

Here, when limiting the above filter to have a predetermined number of elements (for example, 5×5), it may be done with convoluting a high-pass filter to avoid generation of moire. For example, the coefficient analyzing unit 10 may extract a 3×3 filter from a calculated filter, convolute a 3×3 high-pass filter, then generates a 5×5 filter.

<Area Setting Based on Chart>

Figure 23:
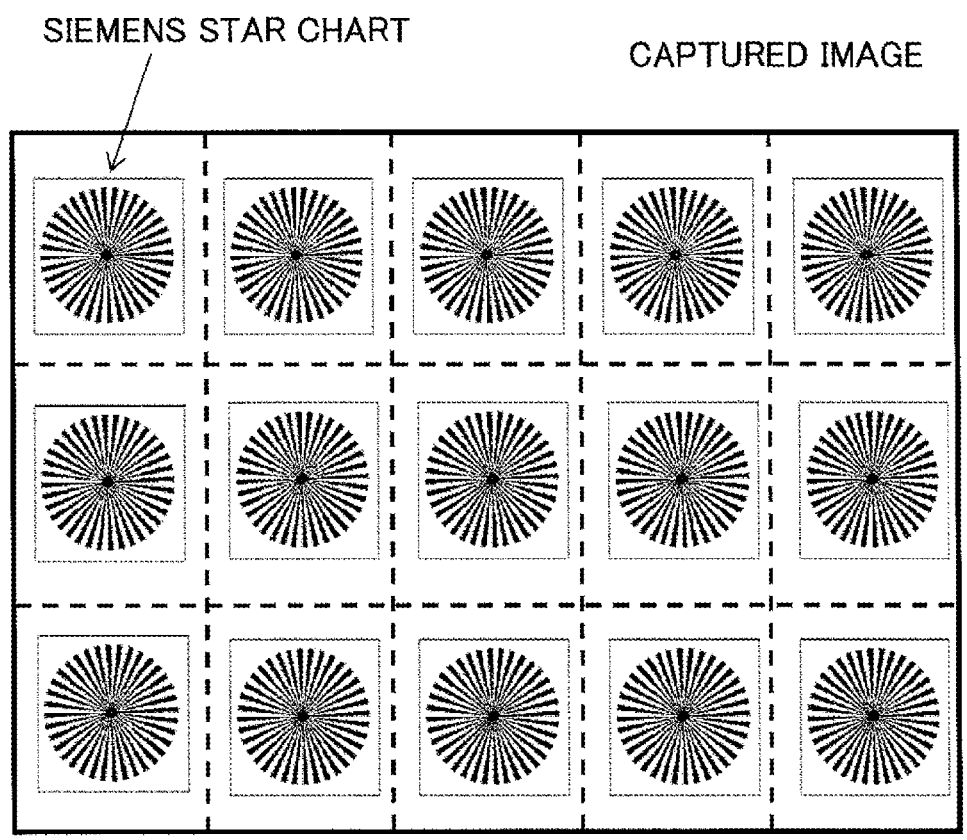
FIG. 23 is a schematic view illustrating an example of charts included in a captured image.

Next, area setting based on Siemens star charts mentioned above will be described. FIG. 23 is a schematic view illustrating an example of charts included in a captured image. In an example illustrated in FIG. 23, 15 charts are disposed in the image. In this case, the coefficient analyzing unit 10 calculates a filter for each of the charts.

Figures 24, 25:
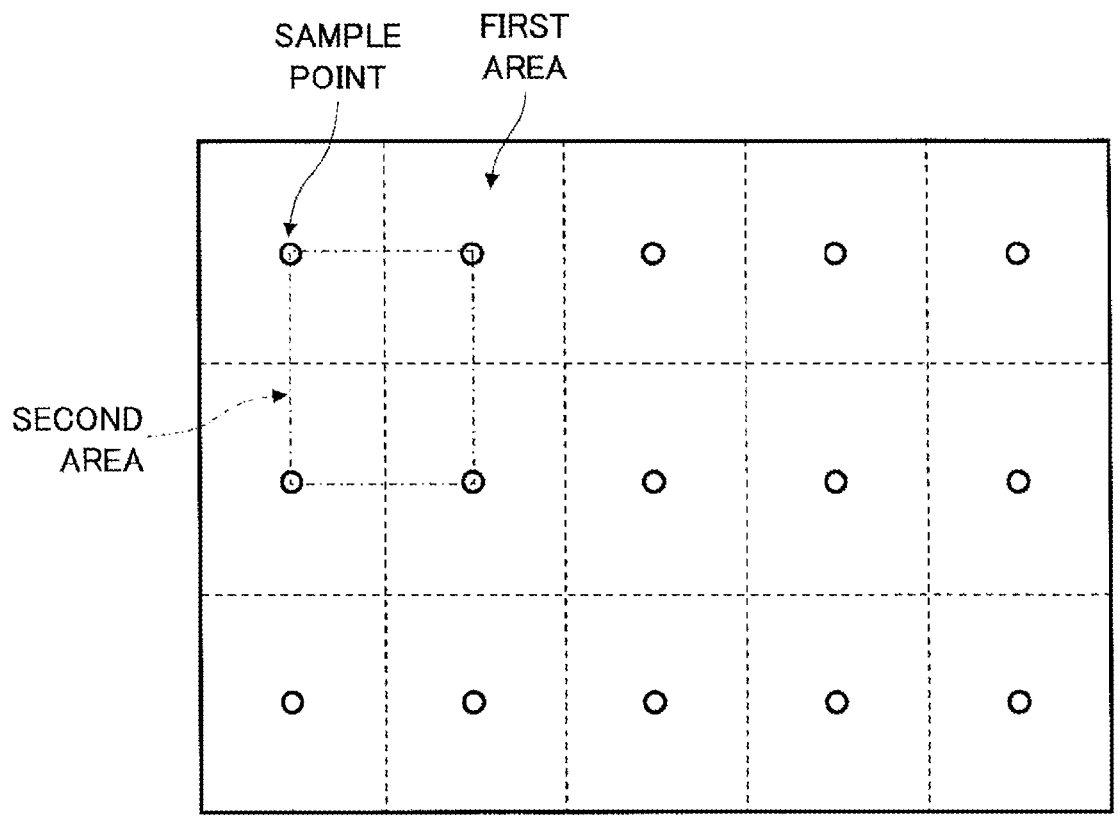
FIG. 24 is a schematic view illustrating area setting based on a chart.
FIG. 25 is a schematic view illustrating an example of a filter table.

FIG. 24 is a schematic view illustrating area settings based on a chart. In an example illustrated in FIG. 24, the first setting section 402 sets first areas with the size that is the same as the size of the charts. In FIG. 24, areas separated by dashed lines are first areas.

The second setting section 403 sets a second area to an area enclosed by sample points of the first areas. In FIG. 24, the area separated by dashed-dotted lines is a second area. Here, the sample points are set to, for example, center positions of the charts or center positions of the first areas. Also, a sample point is associated with filtering coefficients of a filter.

FIG. 25 is a schematic view illustrating an example of a filter table. The filter table illustrated in FIG. 25 associates a pixel position of a sample point with a group of filtering coefficients (for example, 5×5 filtering coefficients) in a record. The filter table illustrated in FIG. 25 is stored in the filter control unit 42. FILn illustrated in FIG. 25 includes 25 filtering coefficients.

Here, filtering coefficients may be calculated differently from the above. For example, as disclosed in Japanese Laid-open Patent Publication No. 2012-23498, the image processing unit 4 may calculate filtering coefficients at positions based on lens data including a lens surface form, thickness, material, and the like of the optical system described in a predetermined format.

Also, the present embodiment is applicable to a process for emphasizing edges by filters, a filtering process for intentionally adding defocus (for example, diorama mode), texture processing used in generating a panoramic image, and the like because filtering coefficients are changed depending on positions in an image.

Here, the image processing unit 4 may be configured with, for example, an image processing LSI or a DSP (Digital Signal Processor). In this case, the RAW memory 41 is a memory built into the DSP or an external memory. Also, the post processing unit 5, the image memory 8, the coefficient analyzing unit 10, VRAMs for displaying and the like may be included in a single DSP along with the image processing unit 4. Also, the coefficient analyzing unit 10 may be configured as a separate unit or included in an image processing apparatus including other units.

Alternatively, instead of a special-purpose DSP, a general-purpose processor such as a CPU may implement functions of the image processing unit 4 and the coefficient analyzing unit 10 by executing predetermined programs. Similarly, the drive control unit 6, the control unit 7 and the post processing unit 5 may be configured with at least one special-purpose or general-purpose processor.

Here, embodiments of the present invention include a program that has a processor function as the image processing unit 4 or the coefficient analyzing unit 10, and a recording medium that records the program. Here, a recording medium is assumed to be non-transitory and does not include a transitory medium such as a signal itself.

<Operations>

Figure 26:
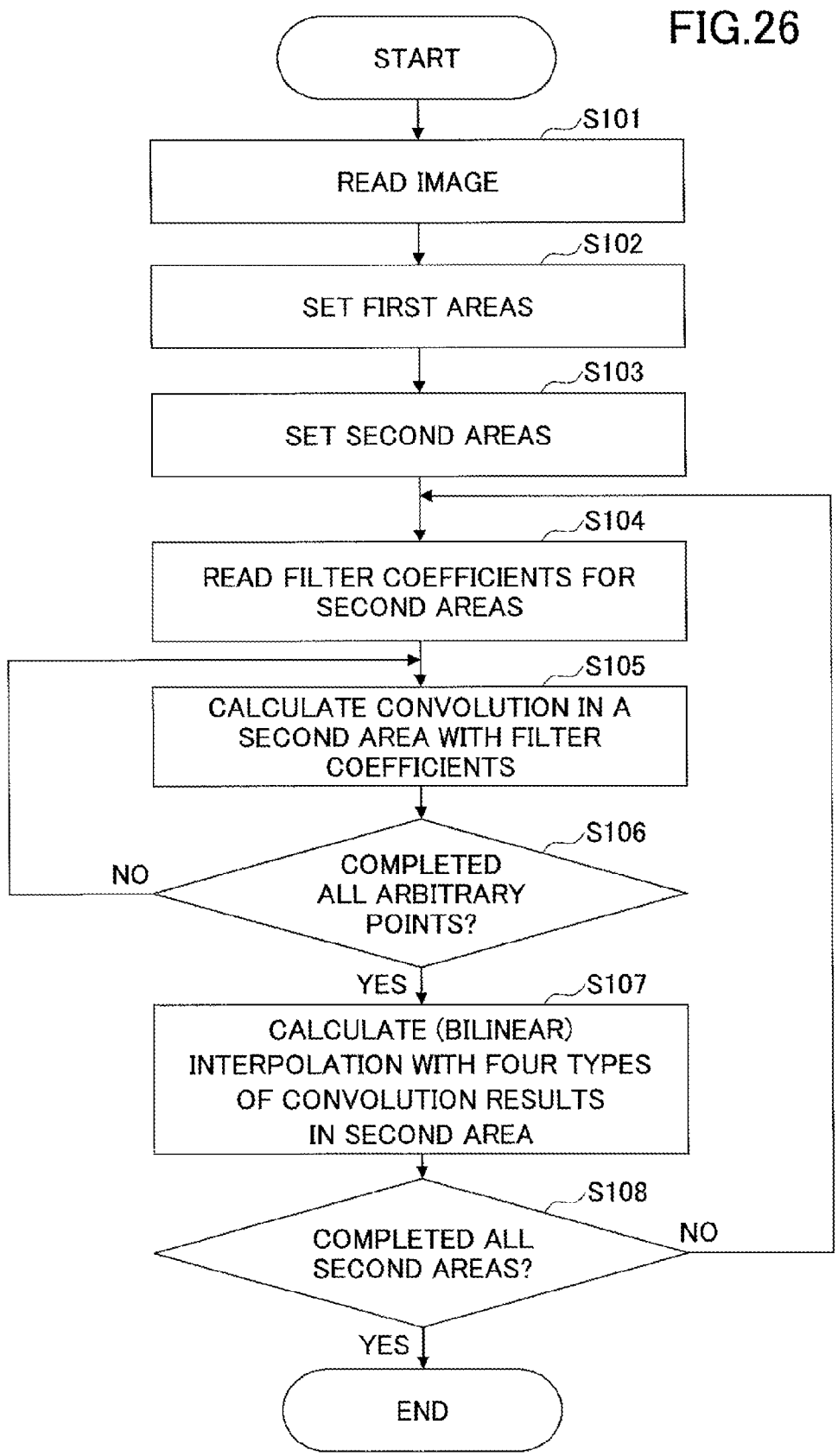
FIG. 26 is a flowchart illustrating an example of an interpolation procedure according to the first embodiment.

Next, operations of the image processing unit 4 will be described according to the first embodiment. FIG. 26 is a flowchart illustrating an example of an interpolation procedure according to the first embodiment. At Step S101 illustrated in FIG. 26, the reading section 401 reads an image from the RAW memory 41.

At Step S102, the first setting section 402 partitions the image into first areas. The first areas may be set to have the same size as a chart or a predetermined size.

At Step S103, the second setting section 403 defines second areas enclosed by arbitrary points (sample points) of the first areas.

Here, the second setting section 403 may set second areas first, then the first setting section 402 may set first areas based on the second areas already set. Namely, Steps S102-S103 may be executed in a reversed order.

At Step S104, the calculation section 404 reads filtering coefficients associated with four arbitrary points included in a second area from the filter control unit 42.

At Step S105, the calculation section 404 calculates convolution on the second area using the filtering coefficients associated with one of the four arbitrary points.

At Step S106, the calculation section 404 determines whether convolution has been calculated with the filtering coefficients for all of the four arbitrary points. If all calculated (Step S106—YES), the procedure goes to Step S107, otherwise (Step S106—NO), goes back to Step S105.

At Step S107, the interpolation section 405 executes interpolation (for example, bilinear interpolation) using the four convolution calculation results on the second area.

At Step S108, the interpolation section 405 determines whether interpolation has been executed on all second areas. If interpolation has been executed on all second areas (Step S108—YES), the procedure ends, otherwise (Step S108—NO), it goes back to Step S104 to repeat Steps S104-S108 on another one of the second areas.

As above, according to the first embodiment, the amount of calculation can be reduced if using a filter specific to an area and generating a compensated image by interpolating pixels other than the arbitrary pixel in the area. Also, according to the first embodiment, degradation of picture quality perceived by a user can be avoided even if the amount of calculation is reduced.

Second Embodiment

Next, an image processing apparatus will be described according to the second embodiment. According to the second embodiment, the process corresponding to the image processing unit 4 in the first embodiment is executed by a CPU, a DSP, and the like.

<Configuration>

Figure 27:
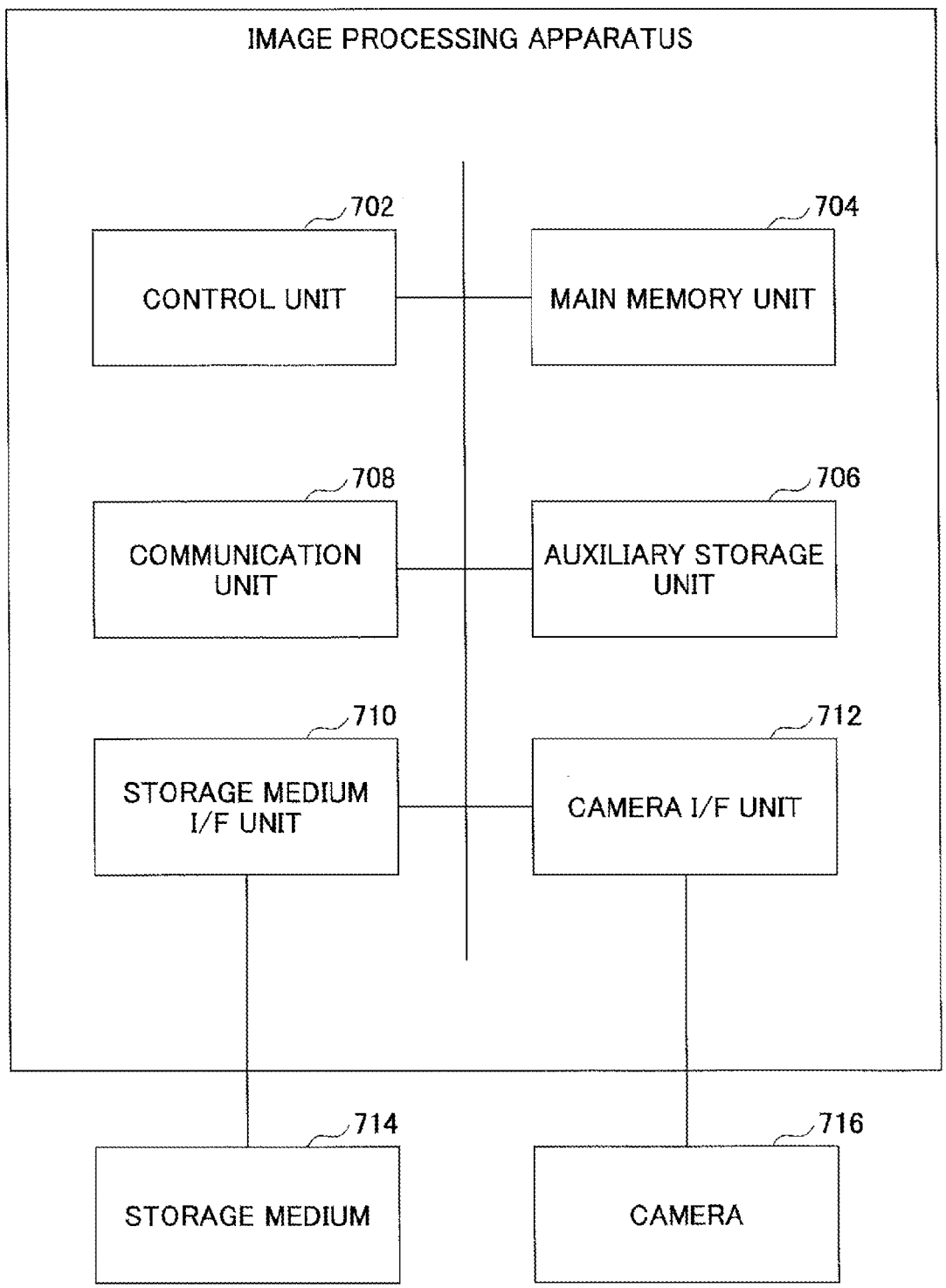
FIG. 27 is a block diagram illustrating an example of a general configuration of an image processing apparatus according to a second embodiment.

FIG. 27 is a block diagram illustrating an example of a general configuration of the image processing apparatus according to the second embodiment. The image processing apparatus illustrated in FIG. 27 includes a control unit 702, a main memory unit 704, an auxiliary storage unit 706, a communication unit 708, a storage medium I/F unit 710, a camera I/F unit 712. The units are mutually connected by a bus for sending/receiving data. The image processing apparatus is an apparatus having information processing functions, for example, a PC (Personal Computer), a server, a smart phone, a tablet terminal, or the like.

The control unit 702 is a CPU (Central Processing Unit) that controls devices and operates on data in the image processing apparatus. Also, the control unit 702 is an execution unit that executes a program stored in the main memory unit 704 or the auxiliary storage unit 706.

Also, the control unit 702 can execute coefficient analysis and image processing by executing programs for the analysis and processing stored, for example, in the auxiliary storage unit 706.

The main memory unit 704 is a ROM (Read-Only Memory), a RAM (Random Access Memory) or the like, which is a storage device to store or to temporarily store an OS, or the basic software executed by the control unit 704, programs such as application software or the like, and data.

The auxiliary storage unit 706 is an HDD (Hard Disk Drive) or the like, which is a storage device to store data related to the application software and the like. Also, the auxiliary storage unit 706 may store programs for coefficient analysis or image processing obtained from the recording medium 714 or the like.

The communication unit 708 executes wired or wireless communication. The communication unit 708 obtains multiple images from, for example, a server, and stores the images, for example, in the auxiliary storage unit 706.

The storage medium I/F (interface) unit 710 is an interface between the image processing apparatus and the storage medium 714 (for example, a flash memory) connected via a data transmission line such as a USB (Universal Serial Bus).

Also, the storage medium 714 may store the coefficient analysis program and image processing program described in the first embodiment, which may be installed in the image processing apparatus via the storage medium I/F unit 710. In this way, the installed coefficient analysis program and image processing program become executable on the image processing apparatus.

The camera I/F unit 712 is an interface for communicating with a camera 716. A chart image or an ordinary image to be compensated that is captured by the camera 716 is obtained by the camera I/F unit 712 from the camera 716 to be stored into the auxiliary storage unit 706, or the like.

The camera 716 captures a chart image as illustrated in FIG. 23 or the like or an ordinary image including scenes, people, etc. A captured image is taken into the image processing apparatus via the camera I/F unit 712. Here, the camera 716 may be built into the image processing apparatus.

In this way, the image processing apparatus obtains a chart image, calculates filters at positions, and generates a compensated image using filters specific to the positions with a reduced number of operations.

Thus, it is possible to have a computer execute coefficient analysis and image processing described in the above embodiments by recording a program implementing coefficient analysis and image processing according to the above embodiments in a recording medium.

For example, by recording the program in a recording medium, and having a computer, a portable terminal, a smart phone, or a tablet terminal read the recording medium including the program, coefficient analysis and image processing described above can be implemented.

Here, various types of recording media can be used including a recording medium that records information optically, electrically, or magnetically such as a CD-ROM, a flexible disk, an optical magnetic disk and the like, and a semiconductor memory and the like that records information electrically such as a ROM, a flash memory, and the like. Also, a transitory medium such as a transmission wave or the like is not included.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   a processor; and
   a memory storing computer readable code that, when executed, causes the processor to:
   calculate filtering coefficients for each of sample points in several of a plurality of first areas of an image, the image being partitioned into the plurality of first areas, the image being partitioned differently into a plurality of second areas, one of the plurality of second areas being enclosed by the sample points in the several of the plurality of first areas;
   calculate a convoluted image of the one of the plurality of second areas using the filtering coefficients calculated for a corresponding one of the sample points, the calculation of a convoluted image being executed repeatedly for all the sample points which enclose the one of the plurality of second areas;
   move pixels at a same position in convoluted images of the one of the plurality of second areas to positions of the sample points in the several of the plurality of first areas, respectively; and
   interpolate a pixel in the one of the plurality of second areas using the pixels moved to the positions of the sample points, by bilinear interpolation.

2. The image processing apparatus as claimed in claim 1, wherein, when the code is executed, the processor is caused to
   partition the image into the plurality of first areas each being provided for calculating the filtering coefficients; and
   partition the image into the plurality of second areas so that each of the plurality of second areas is defined as a unit area to which the interpolation of pixels contained therein is applied.

3. The image processing apparatus as claimed in claim 1, wherein, when the code is executed, the processor is caused to:
   analyze resolution degradation of an image at least in two directions, the image capturing a plurality of objects, each of the objects having a radial pattern;

adjust a weight coefficient of a filter parameter in a direction having lower resolution than the other directions based on an analysis result by the analyzing, for an image compensated by filters determined with a defocus function of the image;

determine filter data including the adjusted weight coefficient; and calculate a filter based on the filter data, wherein a size of the first area is a size of the object.

4. An image processing method comprising:

calculating filtering coefficients for each of sample points in several of a plurality of first areas of an image, the image being partitioned into the plurality of first areas the image being partitioned differently into a plurality of second areas, one of the plurality of second areas being enclosed by the sample points in the several of the plurality of first areas, calculating a convoluted image of the one of the plurality of second areas using the filtering coefficients calculated for a corresponding one of the sample points the calculation of a convoluted image being executed repeatedly for all the sample points which enclose the one of the plurality of second areas;

moving pixels at a same position in convoluted images of the one of the plurality of second areas to positions of the sample points in the several of the plurality of first areas, respectively; and interpolating a pixel in the one of the plurality of second areas using the pixels moved to the positions of the sample points, by bilinear interpolation.

5. A computer-readable recording medium having a program stored therein for causing a computer to execute an image processing method, the method comprising:

calculating filtering coefficients for each of sample points in several of a plurality of first areas of an image, the image being partitioned into the plurality of first areas the image being partitioned differently into a plurality of second areas, one of the plurality of second areas being enclosed by the sample points in the several of the plurality of first areas, calculating a convoluted image of the one of the plurality of second areas using the filtering coefficients calculated for a corresponding one of the sample points the calculation of a convoluted image being executed repeatedly for all the sample points which enclose the one of the plurality of second areas, moving pixels at a same position in convoluted images of the one of the plurality of second areas to positions of the sample points in the several of the plurality of first areas, respectively; and interpolating a pixel in the one of the plurality of second areas using the pixels moved to the positions of the sample points, by bilinear interpolation.

6. The image processing apparatus as claimed in claim 3, wherein a sample arbitrary point in one of the first areas is positioned at a center position of the radial pattern or a center position of the one of the first areas.

* * * * *